US012563057B2

(12) United States Patent
Mitin

(10) Patent No.: US 12,563,057 B2
(45) Date of Patent: Feb. 24, 2026

(54) METHOD AND A SYSTEM FOR TRAFFIC TUNNELING IN A DISTRIBUTED NETWORK FOR MALWARE DETECTION

(71) Applicant: F.A.C.C.T. NETWORK SECURITY LLC, Moscow (RU)

(72) Inventor: Arseniy Mitin, Moscow (RU)

(73) Assignee: GROUP-IB GLOBAL PRIVATE LIMITED, Singapore (SG)

( * ) Notice: Subject to any disclaimer, the term of this patent is extended or adjusted under 35 U.S.C. 154(b) by 132 days.

(21) Appl. No.: 18/619,624

(22) Filed: Mar. 28, 2024

(65) Prior Publication Data

US 2025/0016180 A1    Jan. 9, 2025

(30) Foreign Application Priority Data

Jul. 4, 2023    (RU) ............................ RU2023117569

(51) Int. Cl.
*H04L 9/40*            (2022.01)

(52) U.S. Cl.
CPC ...... *H04L 63/1416* (2013.01); *H04L 63/1425* (2013.01); *H04L 63/1466* (2013.01)

(58) Field of Classification Search
CPC ............. H04L 63/1466; H04L 63/1425; H04L 63/1416
See application file for complete search history.

(56) References Cited

U.S. PATENT DOCUMENTS

| | | | |
|---|---|---|---|
| 7,680,943 B2 | 3/2010 | Conta et al. | |
| 7,840,701 B2 | 11/2010 | Hsu et al. | |
| 10,404,661 B2 | 9/2019 | Ettema et al. | |
| 10,791,132 B1 | 9/2020 | Power et al. | |
| 2005/0086367 A1 | 4/2005 | Conta et al. | |

(Continued)

FOREIGN PATENT DOCUMENTS

| | | |
|---|---|---|
| RU | 2595968 C2 | 8/2016 |
| RU | 2797264 C1 | 6/2023 |
| WO | 2016/081561 A1 | 5/2016 |

OTHER PUBLICATIONS

Search Report with regard to the counterpart NL Patent Application No. 2034309 completed May 17, 2024.

(Continued)

*Primary Examiner* — Vance M Little
(74) *Attorney, Agent, or Firm* — BCF LLP

(57)            ABSTRACT

A method and an electronic device for traffic tunneling in a distributed network for detecting malicious content are provided. The method comprises: transmitting, to a central server, a request for receiving a gateway data from a given gateway; in response to receiving the gateway data, adding the given gateway as a peer to a WireGuard interface of an electronic device; transmitting, to the central server, an Address Resolution Protocol (ARP) probe which is indicative of whether the electronic device is ready to establish a p2p connection with the given gateway; in response to receiving a response to the ARP probe, updating the gateway data in a neighbor table hosted on the given emitter; transmitting an outgoing traffic packet to the given gateway for natting; in response to receiving, from the given gateway, an incoming traffic packet, analyzing a content of the incoming traffic packet for maliciousness.

34 Claims, 10 Drawing Sheets

(56) References Cited

U.S. PATENT DOCUMENTS

| | | | |
|---|---|---|---|
| 2011/0013520 A1* | 1/2011 | Dunn | ................. H04L 41/0659 |
| | | | 370/242 |
| 2011/0103264 A1* | 5/2011 | Wentink | ............... H04W 8/005 |
| | | | 370/255 |
| 2012/0096184 A1* | 4/2012 | Lambert | ............ H04L 61/5038 |
| | | | 709/245 |
| 2012/0224578 A1* | 9/2012 | Mih | .................... H04L 12/4633 |
| | | | 370/392 |
| 2014/0317276 A1 | 10/2014 | Tie et al. | |
| 2015/0098465 A1 | 4/2015 | Caputo, II et al. | |
| 2015/0319136 A1 | 11/2015 | Xie et al. | |
| 2016/0357957 A1 | 12/2016 | Deen et al. | |
| 2018/0332005 A1 | 11/2018 | Ettema et al. | |
| 2019/0245887 A1 | 8/2019 | Vierra | |
| 2020/0252429 A1 | 8/2020 | Venu | |
| 2020/0389469 A1 | 12/2020 | Litichever et al. | |
| 2022/0045905 A1 | 2/2022 | Hankins et al. | |
| 2022/0166755 A1 | 5/2022 | Moore et al. | |
| 2023/0097734 A1 | 3/2023 | Parla et al. | |
| 2023/0164113 A1 | 5/2023 | Gupta et al. | |
| 2023/0308458 A1 | 9/2023 | Varsanyi et al. | |
| 2023/0388275 A1 | 11/2023 | Mitin | |

OTHER PUBLICATIONS

Office Action with regard to U.S. Appl. No. 18/106,597 dated Mar. 26, 2025.

"Sandbox (computer security)", Wikipedia, retrieved on en.wikipedia. org/wiki/Sandbox_(security) on Feb. 6, 2023, pdf 3 pages.

"Virtual private network", Wikipedia, retrieved on en.wikipedia. org/wiki/VPN on Feb. 6, 2023, pdf 12 pages.

"Tunneling protocol", Wikipedia, retrieved on https://en.wikipedia. org/wiki/Tunneling_protocol on Feb. 6, 2023, pdf 5 pages.

"Next Hop Resolution Protocol", Wikipedia, retrieved on en.wikipedia. org/wiki/Next_Hop_Resolution_Protocol on Feb. 6, 2023, pdf 2 pages.

Search Report with regard to the counterpart RU Patent Application No. 2023110050 dated Jan. 17, 2024.

Wikipedia, "Network address translation", https://ru.wikipedia.org/ wiki/NAT accessed on Feb. 15, 2024, 14 pages.

Search Report with regard to the counterpart RU Patent Application No. 2022114307 completed Jan. 27, 2023.

Search Report with regard to the counterpart RU Patent Application No. 2023117569 dated Apr. 16, 2024.

Notification of Granting with regard to the SG Patent Application No. 10202300726U issued Sep. 1, 2025.

* cited by examiner 300, 302

310 — Creating WireGuard and GRE interfaces at the central server

320 — Generating a private key at the central server

330 — Setting listening port at the central server

340 — Generating configuration files for emitters and gateways at the central server 350 — Configuring routs at the central server 360 — Registering peers 370 — Configuring peers 300, 400

410   Transmitting outgoing traffic packet from the emitter to the central server 415   Receiving outgoing traffic packet from the emitter at the central server 420   Redirecting packet from the central server to the gateway 425   Receiveing the packet at the gateway from the central server 430   Forwarding the packet from the gateway to the external server

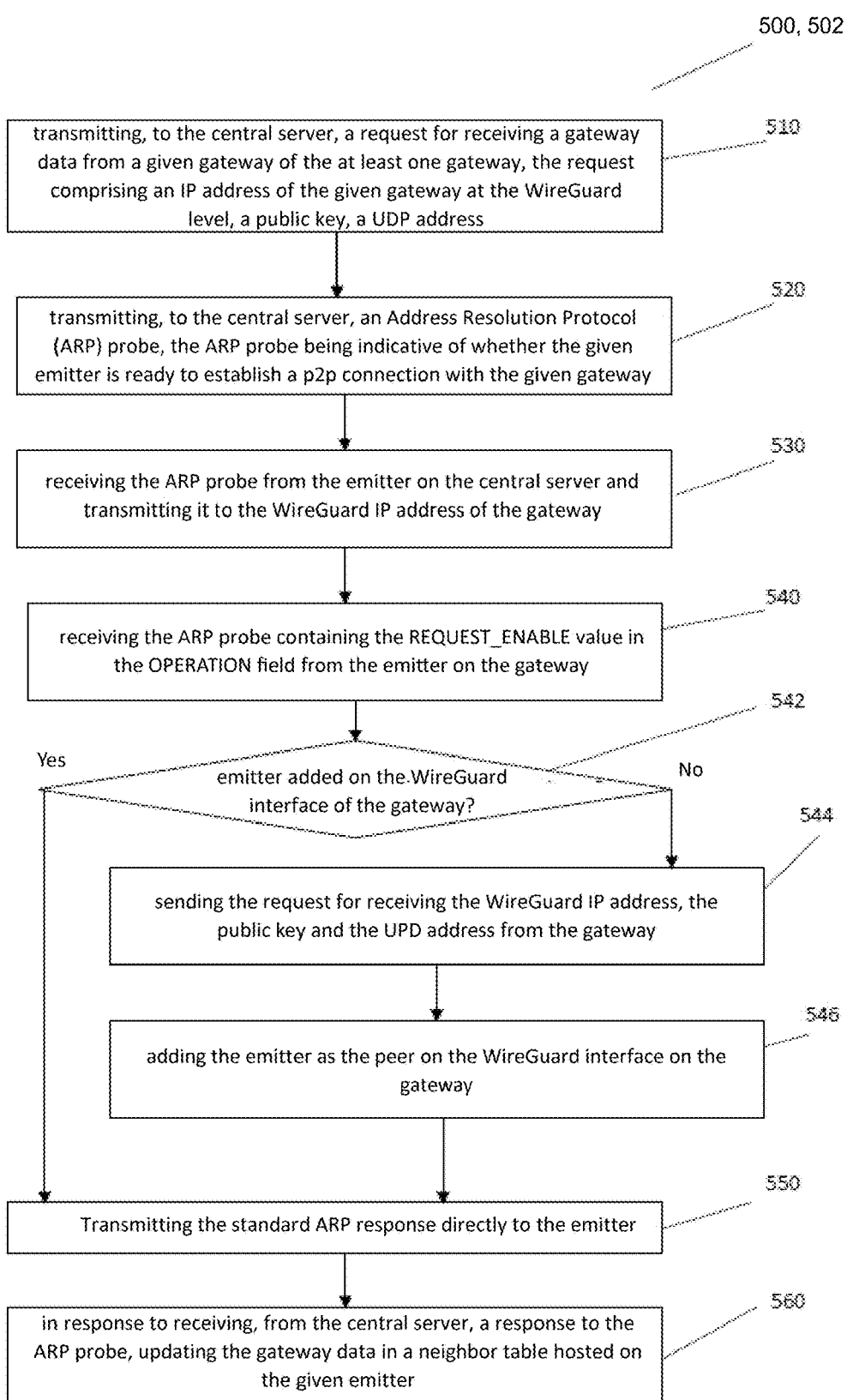

500, 502 transmitting, to the central server, a request for receiving a gateway data from a given gateway of the at least one gateway, the request comprising an IP address of the given gateway at the WireGuard level, a public key, a UDP address

510 transmitting, to the central server, an Address Resolution Protocol (ARP) probe, the ARP probe being indicative of whether the given emitter is ready to establish a p2p connection with the given gateway

520 receiving the ARP probe from the emitter on the central server and transmitting it to the WireGuard IP address of the gateway

530 receiving the ARP probe containing the REQUEST_ENABLE value in the OPERATION field from the emitter on the gateway

540

542 emitter added on the WireGuard interface of the gateway?

Yes        No sending the request for receiving the WireGuard IP address, the public key and the UPD address from the gateway

544 adding the emitter as the peer on the WireGuard interface on the gateway

546

Transmitting the standard ARP response directly to the emitter

550 in response to receiving, from the central server, a response to the ARP probe, updating the gateway data in a neighbor table hosted on the given emitter

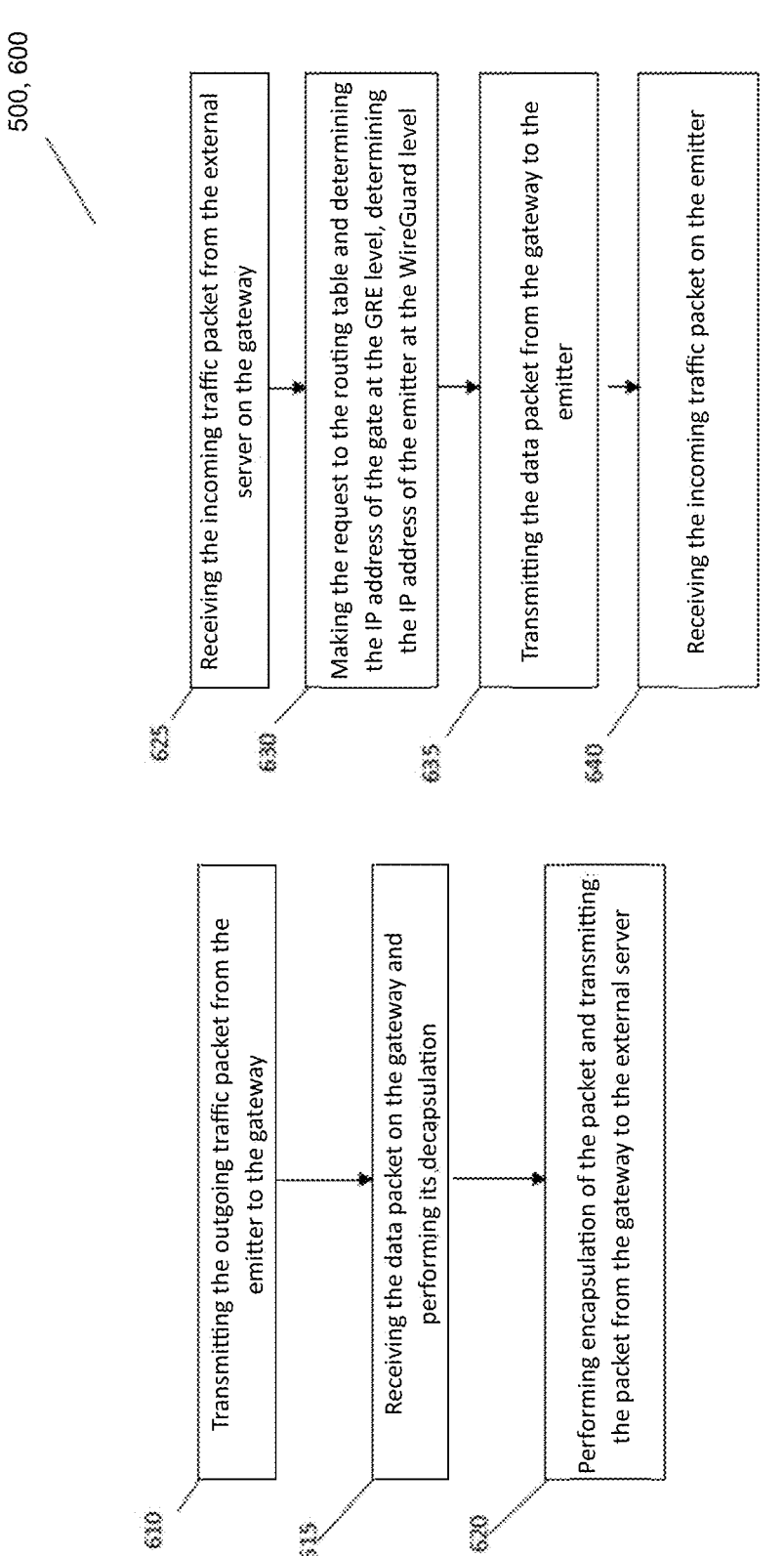

500, 600

625 — Receiving the incoming traffic packet from the external server on the gateway 630 — Making the request to the routing table and determining the IP address of the gate at the GRE level, determining the IP address of the emitter at the WireGuard level 635 — Transmitting the data packet from the gateway to the emitter 640 — Receiving the incoming traffic packet on the emitter

*FIG. 6B*

610 — Transmitting the outgoing traffic packet from the emitter to the gateway

615 — Receiving the data packet on the gateway and performing its decapsulation

620 — Performing encapsulation of the packet and transmitting the packet from the gateway to the external server

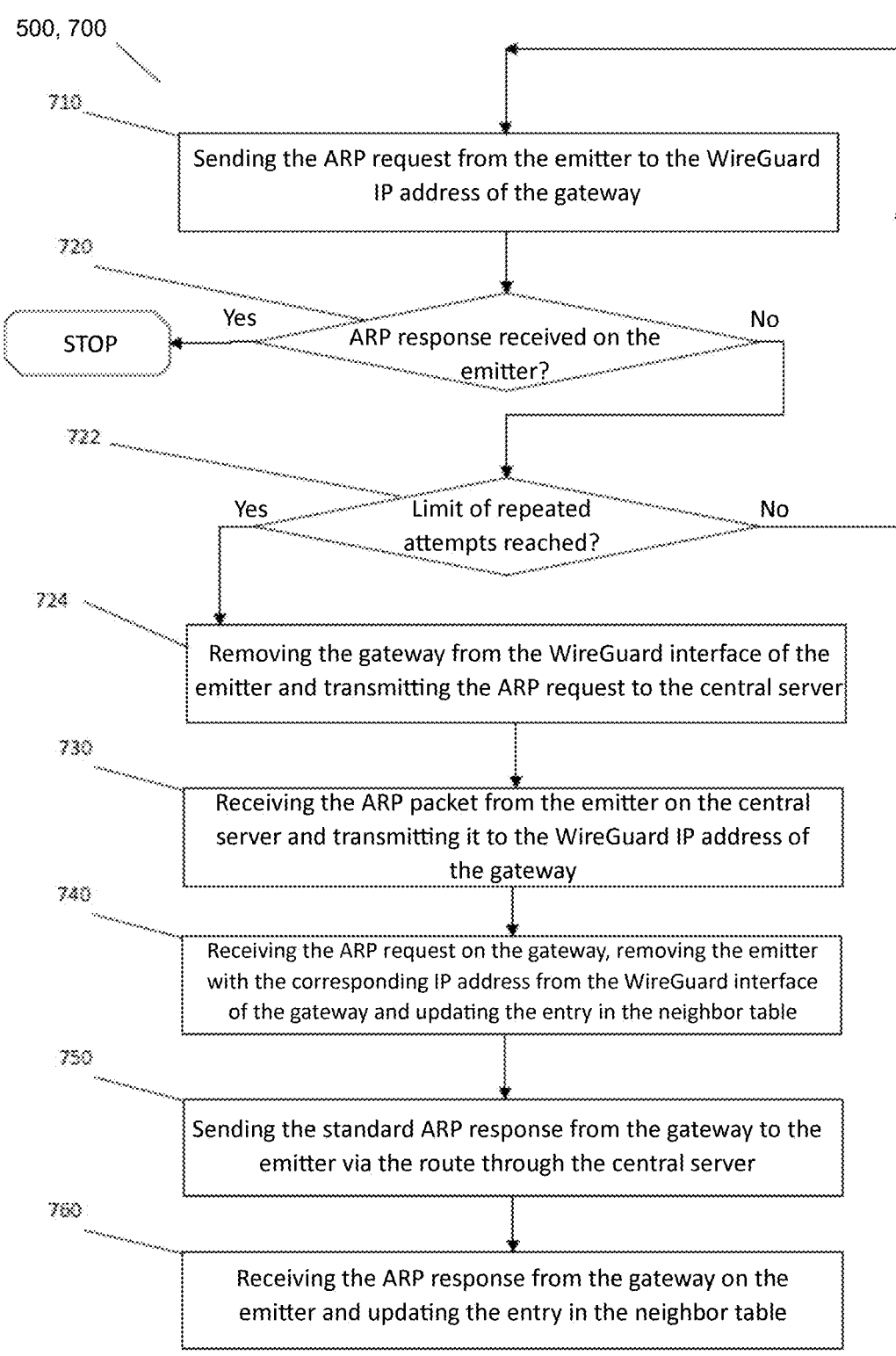

710

Sending the ARP request from the emitter to the WireGuard IP address of the gateway

720

STOP    Yes    ARP response received on the emitter?    No

722

Yes    Limit of repeated attempts reached?    No

724

Removing the gateway from the WireGuard interface of the emitter and transmitting the ARP request to the central server

730

Receiving the ARP packet from the emitter on the central server and transmitting it to the WireGuard IP address of the gateway

740

Receiving the ARP request on the gateway, removing the emitter with the corresponding IP address from the WireGuard interface of the gateway and updating the entry in the neighbor table

750

Sending the standard ARP response from the gateway to the emitter via the route through the central server

760

Receiving the ARP response from the gateway on the emitter and updating the entry in the neighbor table

*FIG. 7*

METHOD AND A SYSTEM FOR TRAFFIC TUNNELING IN A DISTRIBUTED NETWORK FOR MALWARE DETECTION

CROSS-REFERENCE

The present application claims priority to a Russian patent application No.: 2023117569, filed on Jul. 4, 2023, and entitled "A PROCESS AND A SYSTEM FOR ACCELERATED TRAFFIC TUNNELING IN A DISTRIBUTED NETWORK FOR MALWARE DETONATION," the content of which is incorporated herein by reference in its entirety.

FIELD OF THE TECHNOLOGY

The present technology relates broadly to a field of cybersecurity; and more specifically, to a method and a system for traffic tunneling in a distributed network for malware detection.

BACKGROUND

Cybersecurity experts predict that the number and technical complexity of cybercrime will continue to increase. Cyber criminals are apt to quickly adapt malware to increase its effectiveness and overcome certain methods of malware counteraction. In response to the technical development of the malware, technical means for detecting it hence preventing malware attacks also continue to improve.

Modem Attack Detection Technologies (ADTs) are capable of performing a behavioral analysis of a potential malware. The behavioral analysis includes running executable files of the potential malware in a special isolated environment (also known as "isolated environments") for intentional causing the potential malware to execute a malicious scenario (or otherwise "to detonate") for further identifying malware.

Sandboxes are described in more detail in an article entitled "Sandbox (security)" on Wikipedia™ (en.wikipedia.org/wiki/Sandbox_(computer_security). In response to development of sandboxes, attackers implemented more complex types of malware. Such malware, for example, can analyze and determine the environment it has been downloaded into. As a result, the behavior of malware downloaded into sandbox may differ from behavior of malware downloaded into non-isolated, user, environment.

For example, some malware can bypass static software analysis, which is conducted, by the user or isolated environment, by analyzing different sources of an executable file without executing and studying each source separately. Some malware can stay unnoticed even after the dynamic analysis, which is also known as "behavioral analysis". The behavioral or dynamic analysis is conducted by monitoring the malware behavior executed in the sandbox. If a malicious activity is detected, the malware will be blocked and a client will be eventually informed about a planned, ongoing or already conducted attack depending on a responding method.

Some malware could bypass sandboxes unnoticed because they don't contain a malicious code. Instead, they download it from a remote server, but only if the malware is downloaded into client's network, actual user environment. Thus, fraudsters may prepare a target attack on a specific organization by configuring the remote server in such a way that the remote server would send the malicious file only if a request is received from one of corporate subnets belonging to the target organization of the attackers. If the remote server receives the request from any other IP not belonging to a corporate subnet, the remote server would mimic to ordinary web-server and send a non-malicious response.

A technique of replacing the IP address with the desired one, such as a Network Address Translation (NAT) technique (also known as "masquerading" or simply "natting", for short) may seem to be an obvious solution for such a situation. Natting is a method of broadcasting a network address, where a sender's IP address is specified dynamically depending on what IP address has been assigned to interface IP address. More details on the natting are available, for example, in article entitled "NAT" on Wikipedia™ (en.wikipedia.org/wiki/NAT).

Unfortunately, the simplest implementation of the NAT technique, where the IP address of a sandbox that is not located on the corporate subnet, is replaced with an IP address of the corporate subnet, may not be effective. More specifically, the attacker's remote server, upon receiving a request from the corporate subnet, sends a response to the IP address of the corporate subnet. The corporate subnet would most likely ignore the incoming packet received as a response from the attacker's server, since it did not send the request to the remote attacker's server.

In order for the corporate subnet could re-send the incoming packet received in response from the intruders' server to the sandbox, the sandbox indeed must be present in a corporate subnet. This may be challenging to implement from a technical perspective and, besides technical difficulties, it is a resource-intensive task for computational equipment of a given corporation. Therefore, a network environment is one of vulnerable areas, which may enable the attacker to understand that the malware execution occurs in the emulated environment. In order for the modern ADTs to effectively resist rapidly developing malware types, they must be capable of emulating the network environment at a certain level of complexity such that they are not easily identified by the cyber criminals.

One of possible exemplary solutions of the network environment issue, when the sandbox is present in the corporate subnet and a router performs natting of an outgoing traffic, while replacing a local IP address of the sandbox with a public IP address of the corporate subnet, is a virtual private network or VPN.

The VPN, as described, for example, in an article entitled "VPN" on Wikipedia™ (en.wikipedia.org/wiki/VPN), is a generic name for technologies that allow one or more network connections to be provided over another network, such as the Internet. Each of the network participants, so called peers, has its own local IP address. The routing of each peer is configured by forwarding packets to the Internet through the server. So, for each outgoing packet passing through the server, natting is performed. And for each incoming packet, denatting is performed—the public IP address is replaced with the local IP address of the peer. If the sandbox is one of the peers and is in the corporate VPN network, the natting technology works and solves the problem of IP address replacing. However, this solution may not be effective as one of its disadvantages is a client-server architecture, which requires constantly keeping a large number of connections up to date, which is, in turn, resource-intensive.

Various approaches of traffic tunneling are also known from the prior art. Traffic tunneling is a process that creates a logical connection between two endpoints through encapsulation. More specifically, one network protocol is encapsulated in another, that is, the data transmitted through the tunnel is "packed" together with service fields into the payload area of the carrier protocol. Tunneling is described in more detail in an article entitled "Tunneling Protocol" at Wikipedia™ (en.wikipedia.org/wiki/Tunneling_protocol).

The tunneling can be performed for the entire traffic that is generated during conduction of the behavioral analysis prior to a proxy server installed within a client's subnet. The clients are suggested to locate a small proxy server in a demilitarized zone (DMZ) within their subnet. Usually, this server is called an exit node or a gateway. It serves as a gate for tunneling the entire IP traffic that is generated during behavioral analyses of the executable files which relate or are assigned to this client.

Further, various traffic routing protocols are known in the prior art, including the Next Hop Resolution Protocol (NHRP, en.wikipedia.org/wiki/Next_Hop_Resolution_Protocol). The NHRP is an extension of ATM's Address Resolution Protocol (ARP) routing mechanism, which sometimes is used to improve the efficiency of routing computer network traffic over non-broadcast, multi-access networks. This protocol is defined in IETF RFC 2332 and further described in RFC 2333. It can be used by the sender to determine the route to a destination with minimum jumps. The NHRP differs from protocols similar to the ARP in that the former allows optimizing routing between multiple IP subnets.

Since in the distributed network using the NHRP routing protocol is no central server that would store information about the IP addresses of the subnets, traffic routing requires the presence of public IP addresses for each of the subnets.

At the same time, U.S. Pat. No. 7,680,943-B2, issued on Mar. 16, 2010, assigned to Transwitch Licensing LLC, and entitled "METHODS AND APPARATUS FOR IMPLEMENTING MULTIPLE TYPES OF NETWORK TUNNELING IN A UNIFORM MANNER", discloses a uniform method for implementing multiple tunneling protocols in a switch or router. The method is based on the realization that although the tunneling protocols are very different, they do share a similar overall structure which can be exploited to create a unified method of dealing with multiple protocols. By using similar data structures to implement multiple protocols, the invention makes data management and programming simple and, therefore, cost effective. According to the invention, all tunneling protocols are abstracted as the mapping of input L2 or L3 streams with output L2 or L3 streams. Mapping is provided by a finite set of tunnel interfaces. The tunnel interfaces map the input streams to output interfaces. As traffic streams flow through these interfaces, they are processed according to defined attributes of these interfaces.

Also, U.S. Pat. No. 10,404,661-B2, issued on Sep. 3, 2019, assigned to Palo Alto Networks Inc, and entitled "INTEGRATING A HONEY NETWORK WITH A TARGET NETWORK TO COUNTER IP AND PEER-CHECKING EVASION TECHNIQUES", discloses techniques for integrating a honey network with a target network environment (e.g., an enterprise network) to counter IP and peer-checking evasion techniques. In some embodiments, a system for integrating a honey network with a target network environment includes a device profile data store that includes a plurality of attributes of each of a plurality of devices in the target network environment; a virtual clone manager executed on a processor that instantiates a virtual clone of one or more devices in the target network environment based on one or more attributes for a target device in the device profile data store; and a honey network policy that is configured to route an external network communication from the virtual clone for the target device in the honey network to an external device through the target network environment.

Also, United States Patent Application Publication No.: 2023/0388,275-A1, published on Nov. 30, 2023, assigned to F.A.C.C.T. NETWORK SECURITY LLC, and entitled "METHOD AND A SYSTEM OF TUNNELING TRAFFIC IN A DISTRIBUTED NETWORK FOR DETECTING MALWARE," discloses a method and system for tunneling traffic in a distributed network. The method comprises: adding, by a central server, at least one emitter and at least one gateway to a neighbor table hosted on the at least one central server; transmitting an IP address of a given emitter to a respective gateway; transmitting an IP address of the respective gateway to the given emitter; in response to receiving a given packet of outgoing traffic from the given emitter, decapsulating the given packet; identifying at the WireGuard level of the given packet, the IP address of the respective gateway associated with the given emitter; encapsulating the given packet at the WireGuard level and the GRE level; and forwarding the given packet of outgoing traffic to the respective gateway for natting for transmitting the given packet to an external server on behalf of the respective gateway.

SUMMARY

It is an object of the present technology to ameliorate at least some of the inconveniences associated with the prior art.

At least some non-limiting embodiments of the present technology are directed to setting up a direct peer-to-peer transmission of traffic between two electronic devices of a distributed network that are referred to herein as "peers," while bypassing a central server. More specifically, in at least some non-limiting embodiments of the present technology, the central server can be used at a preparatory stage for setting up a direct tunneling between the peers and as a backup route. By doing so, certain non-limiting embodiments of the present technology may allow achieving higher operation ability and fault tolerance of the distributed network.

More specifically, in accordance with a first broad aspect of the present technology, there is provided a computer-implemented method for traffic tunneling in a distributed network for detecting malicious content. The distributed network is implemented by using two-level tunneling including a WireGuard level and a GRE level. The distributed network includes a central server communicatively coupled to at least one emitter and at least one gateway. The at least one emitter being a first peer of the distributed network for analyzing the malicious content and receiving encapsulated packets at the WireGuard and GRE levels. The at least one gateway being a second peer of the distributed network for natting at least one outgoing traffic packet and denatting at least one incoming traffic packet. The method is executable by a given emitter of the at least one emitter. The method comprises: transmitting, to the central server, a request for receiving a gateway data from a given gateway of the at least one gateway, the request comprising an IP address of the given gateway at the WireGuard level, a public key, a UDP address; in response to receiving, from the central server, the gateway data, adding the given gateway as a peer to a WireGuard interface of the given emitter; transmitting, to the central server, an Address Resolution Protocol (ARP) probe, the ARP probe being indicative of whether the given emitter is ready to establish a p2p connection with the given gateway; in response to receiving, from the central server, a response to the ARP probe, updating the gateway data in a neighbor table hosted on the given emitter; transmitting the at least one outgoing traffic packet to the given gateway for natting, the at least one outgoing traffic packet including at least two levels of encapsulation over a transport protocol implemented for forwarding the at least one outgoing traffic packet, via the p2p connection, to the given gateway for natting the at least one outgoing traffic packet for further transmitting the at least one outgoing traffic packet to an external server on behalf of the given gateway; and in response to receiving, from the given gateway, the at least one incoming traffic packet, analyzing a content of the at least one incoming traffic packet for maliciousness.

In some implementations of the method, the request for receiving the gateway data further comprises the IP address of the given gateway at the GRE level.

In some implementations of the method, the IP addresses of one of the given gateway and emitter includes: an Internet IP address; an IP address at the WireGuard level; and an IP address at the GRE level.

In some implementations of the method, prior to the transmitting the request, the at least one emitter and the at least one gateway have been registered on the central server by a respective configuration file.

In some implementations of the method, the method further comprises, prior to the transmitting the request, registering the given emitter on the central server by receiving therefrom a configuration file.

In some implementations of the method, the method further comprises configuring interfaces of the given emitter at the WireGuard level and the GRE level using the configuration file.

In some implementations of the method, in response to a time interval for receiving the APR response after the transmitting the ARP request exceeding a predetermined time threshold, the method further comprises transmitting, to the central server, an additional ARP request.

In some implementations of the method, in response to a number of additional ARP requests exceeding a predetermined number threshold, the method further comprises switching the given emitter to a backup route through the central server.

In some implementations of the method, the switching to the backup route comprises transmitting a respective request to the given gateway.

Further, in accordance with a second broad aspect of the present technology, there is provided a computer-implemented method for traffic tunneling in a distributed network for detecting malicious content. The distributed network is implemented by using two-level tunneling including a WireGuard level and a GRE level. The distributed network includes a central server communicatively coupled to at least one emitter and at least one gateway. The method is executable by a given gateway of the at least one gateway. The method comprises: in response to receiving, from the central server, an Address Resolution Protocol (ARP) probe of a given emitter of the at least one emitter, determining whether an emitter having an IP address indicated in the ARP probe is present on a WireGuard interface of the given gateway; in response to an absence of the emitter having the IP address indicated in the ARP probe on the WireGuard interface of the given gateway, transmitting, to the central server, a request for receiving an emitter data comprising an IP address of the given emitter at the WireGuard level, a public key, a UDP address, for establishing a p2p connection; in response to receiving, from the central server, the emitter data of the given emitter, adding the given emitter as a peer to a neighbor table hosted on the given gateway; transmitting, to the given emitter, a response to the ARP probe therefrom, the response being indicative of the given gateway being ready to establish the p2p connection with the given emitter; in response to receiving, from the given emitter, at least one outgoing traffic packet, decapsulating the at least one outgoing traffic packet; identifying, in the at least one outgoing traffic packet, data of an external server for forwarding the at least one outgoing traffic packet, the data having been specified at a GRE level of the at least one outgoing traffic packet; encapsulating the at least one outgoing traffic packet, the encapsulating including natting the at least one outgoing traffic packet, thereby generating at least one natted outgoing traffic packet, the natting comprising specifying, for the at least one outgoing traffic, an IP address of the given gateway as being a sender of the at least one outgoing traffic packet to the external server; transmitting the at least one natted outgoing traffic packet to the external server; in response to receiving, from the external server, at least one incoming traffic packet, denatting the at least one incoming traffic packet; encapsulating the at least one incoming traffic packet at the WireGuard level and the GRE level, wherein at least one IP address indicated at the WireGuard level differs from at least one IP address indicated at the GRE level; and transmitting the at least one incoming traffic packet to the given emitter for analyzing a content of the at least one incoming traffic packet for maliciousness.

In some implementations of the method, the request for receiving the emitter data of the given emitter further comprises the IP address of the given emitter at the GRE level.

In some implementations of the method, prior to the transmitting the request, the at least one emitter and the at least one gateway have been registered on the central server by a respective configuration file.

In some implementations of the method, the method further comprises, prior to the transmitting the request, registering the given gateway on the central server by receiving therefrom a configuration file.

In some implementations of the method, the method further comprises configuring interfaces at the WireGuard level and the GRE level using the configuration file.

In some implementations of the method, in response to receiving, from the given emitter, a request for switching to a backup route through the central server, the method further comprises switching to the backup route.

Further, in accordance with a third broad aspect of the present technology, there is provided a method for traffic tunneling in a distributed network for malware detonation. The distributed network is implemented by using two-level tunneling including a WireGuard level and a GRE level. The distributed network includes a central server communicatively coupled to at least one emitter and at least one gateway. The method is executable by the central server. The method comprises: in response to receiving, from a given emitter of the at least one emitter, an Address Resolution Protocol (ARP) probe, the ARP probe specifying a first IP address of the given emitter and a second IP address of a respective gateway: determining whether the first IP address of the given emitter has been added to a WireGuard interface of the respective gateway and whether the second IP address of the respective gateway has been added to a WireGuard interface of the given emitter; and in response to determining that the first IP address of the given emitter has been added to a WireGuard interface of the respective gateway and that the second IP address of the respective gateway has been added to a WireGuard interface of the given emitter, transmitting the ARP probe to the respective gateway.

In some implementations of the method, the method further comprises registering the at least one emitter and the at least one gateway on the at least one central server by generating a respective configuration file.

Further, in accordance with a fourth broad aspect of the present technology, there is provided an electronic device for traffic tunneling in a distributed network for detecting malicious content. The distributed network is implemented by using two-level tunneling including a WireGuard level and a GRE level. The electronic device is communicatively coupled, via the distributed network, to a central server and at least one gateway. The electronic device is a first peer of the distributed network for analyzing the malicious content and receiving encapsulated packets at the WireGuard and GRE levels; The at least one gateway is a second peer of the distributed network for natting at least one outgoing traffic packet and denatting at least one incoming traffic packet. The electronic device comprises at least one processor and at least one non-transitory computer-readable memory storing executable instructions, which, when executed by the at least one processor, cause the electronic device to: transmit, to the central server, a request for receiving a gateway data from a given gateway of the at least one gateway, the request comprising an IP address of the given gateway at the WireGuard level, a public key, a UDP address; in response to receiving, from the central server, the gateway data, add the given gateway as a peer to a WireGuard interface of the electronic device; transmit, to the central server, an Address Resolution Protocol (ARP) probe, the ARP probe being indicative of whether the electronic device is ready to establish a p2p connection with the given gateway; in response to receiving, from the central server, a response to the ARP probe, update the gateway data in a neighbor table hosted on the electronic device; transmit the at least one outgoing traffic packet to the given gateway for natting, the at least one outgoing traffic packet including at least two levels of encapsulation over a transport protocol implemented for forwarding the at least one outgoing traffic packet, via the p2p connection, to the given gateway for natting the at least one outgoing traffic packet for further transmitting the at least one outgoing traffic packet to an external server on behalf of the given gateway; and in response to receiving, from the given gateway, the at least one incoming traffic packet, analyze a content of the at least one incoming traffic packet for maliciousness.

In some implementations of the electronic device, the request for receiving the gateway data further comprises the IP address of the given gateway at the GRE level.

In some implementations of the electronic device, the IP addresses of one of the given gateway and the electronic device includes: an Internet IP address; an IP address at the WireGuard level; and an IP address at the GRE level.

In some implementations of the electronic device, prior to transmitting the request, the electronic device and the at least one gateway have been registered on the central server by a respective configuration file.

In some implementations of the electronic device, prior to causing transmitting the request, the at least one processor causes the electronic device to register the electronic device on the central server by receiving therefrom a configuration file.

In some implementations of the electronic device, the at least one processor further causes the electronic device to configure interfaces thereof at the WireGuard level and the GRE level using the configuration file.

In some implementations of the electronic device, in response to a time interval for receiving the APR response after causing transmitting the ARP request exceeding a predetermined time threshold, the at least one processor further causes the electronic device to transmit, to the central server, an additional ARP request.

In some implementations of the electronic device, in response to a number of additional ARP requests exceeding a predetermined number threshold, the at least one processor further causes the electronic device to switch the electronic device to a backup route through the central server.

In some implementations of the electronic device, to switch to the backup route, the at least one processor further causes the electronic device to transmit a respective request to the given gateway.

Further, in accordance with a fifth broad aspect of the present technology, there is provided an electronic device for traffic tunneling in a distributed network for detecting malicious content. The distributed network being implemented by using two-level tunneling including a WireGuard level and a GRE level. The electronic device is communicatively coupled, via the distributed network, to a central server and at least one emitter. The electronic device comprises at least one processor and at least one non-transitory computer-readable memory storing executable instructions, which, when executed by the at least one processor, cause the electronic device to: in response to receiving, from the central server, an Address Resolution Protocol (ARP) probe of a given emitter of the at least one emitter, determine whether an emitter having an IP address indicated in the ARP probe is present on a WireGuard interface of the electronic device; in response to an absence of the emitter having the IP address indicated in the ARP probe on the WireGuard interface of the electronic device, transmit, to the central server, a request for receiving an emitter data comprising an IP address of the given emitter at the WireGuard level, a public key, a UDP address, for establishing a p2p connection; in response to receiving, from the central server, the emitter data of the given emitter, add the given emitter as a peer to a neighbor table hosted on the electronic device; transmit, to the given emitter, a response to the ARP probe therefrom, the response being indicative of the electronic device being ready to establish the p2p connection with the given emitter; in response to receiving, from the given emitter, at least one outgoing traffic packet, decapsulate the at least one outgoing traffic packet; identify, in the at least one outgoing traffic packet, data of an external server for forwarding the at least one outgoing traffic packet, the data having been specified at a GRE level of the at least one outgoing traffic packet; encapsulate, the at least one outgoing traffic packet, by natting the at least one outgoing traffic packet, thereby generating at least one natted outgoing traffic packet, the natting comprising specifying, for the at least one outgoing traffic, an IP address of the electronic device as being a sender of the at least one outgoing traffic packet to the external server; transmit the at least one natted outgoing traffic packet to the external server; in response to receiving, from the external server, at least one incoming traffic packet, denat the at least one incoming traffic packet; encapsulate the at least one incoming traffic packet at the WireGuard level and the GRE level, wherein at least one IP address indicated at the WireGuard level differs from at least one IP address indicated at the GRE level; and transmit the at least one incoming traffic packet to the given emitter for analyzing a content of the at least one incoming traffic packet for maliciousness.

In some implementations of the electronic device, the request for receiving the emitter data of the given emitter further comprises the IP address of the given emitter at the GRE level.

In some implementations of the electronic device, prior to causing transmitting the request, the at least one emitter and the electronic device have been registered on the central server by a respective configuration file.

In some implementations of the electronic device, prior to causing transmitting the request, the at least one processor further causes the electronic device to register the electronic device on the central server by receiving therefrom a configuration file.

In some implementations of the electronic device, the at least one processor further causes the electronic device to configure interfaces at the WireGuard level and the GRE level using the configuration file.

In some implementations of the electronic device, in response to receiving, from the given emitter, a request for switching to a backup route through the central server, the at least one processor further causes the electronic device to switch to the backup route.

Further, in accordance with a sixth broad aspect of the present technology, there is provided a server for traffic tunneling in a distributed network for malware detonation. The distributed network is implemented by using two-level tunneling including a WireGuard level and a GRE level. The server is communicatively coupled, via the distributed network, to at least one emitter and at least one gateway. The server comprises at least one processor and at least one non-transitory computer-readable memory storing executable instructions, which, when executed by the at least one processor, cause the server to: in response to receiving, from a given emitter of the at least one emitter, an Address Resolution Protocol (ARP) probe, the ARP probe specifying a first IP address of the given emitter and a second IP address of a respective gateway: determine whether the first IP address of the given emitter has been added to a WireGuard interface of the respective gateway and whether the second IP address of the respective gateway has been added to a WireGuard interface of the given emitter; and in response to determining that the first IP address of the given emitter has been added to a WireGuard interface of the respective gateway and that the second IP address of the respective gateway has been added to a WireGuard interface of the given emitter, transmit the ARP probe to the respective gateway.

In some implementations of the server, the at least one processor further causes the server to register the at least one emitter and the at least one gateway on the at least one central server by generating a respective configuration file.

In the context of the present specification, unless expressly stated otherwise, the below-listed terms are defined as follows:

a central server is a server in a distributed network, which hosts a neighbor table for configuring routing and issue IP addresses within the distributed network;

a gateway is a peer of the distributed network implemented to nat packets of outgoing traffic;

an emitter is a peer of the distributed network executing one or more sandbox environments;

a peer is a member of the distributed network, for example, a gateway or emitter;

natting is a network address modification, a mechanism implemented at the transport level of networks allowing modifying IP addresses of transit packets;

tunneling is a networking technique where one network protocol is encapsulated within another. The essence of tunneling is to "pack" a portion of data to be transmitted, together with service fields, into the payload area of the carrier protocol packet.

an encapsulation is a method of building modular network protocols where logically independent network functions are abstracted from underlying mechanisms by including or encapsulating these mechanisms in higher-level objects.

a neighbor table is a table hosted by the central server or by the emitter of the distributed network that stores records of the correspondence of IP addresses at the GRE level to IP addresses at the WireGuard level. An analogue of the neighbor table is the Address Resolution Protocol (ARP) table, which stores records about the correspondence of IP addresses to MAC addresses. The operating system (OS) of the central server requests these tables during routing packets in order to obtain the destination address at the underlying network level.

an interface is an interface of interaction with the WireGuard or GRE software; and a polygon is a set of isolated environments for detection and analysis of potentially malicious content.

an ARP request/ARP response are messages transmitted over an Address Resolution Protocol (ARP) protocol. Transmitting messages using a technology that is similar or analogous to the ARP is also envisioned.

In the context of the present specification, unless expressly provided otherwise, a computer system may refer, but is not limited, to an "electronic device", an "operation system", a "system", a "computer-based system", a "controller unit", a "control device" and/or any combination thereof appropriate to the relevant task at hand.

In the context of the present specification, unless expressly provided otherwise, the expression "computer-readable medium" and "memory" are intended to include media of any nature and kind whatsoever, non-limiting examples of which include RAM, ROM, disks (CD-ROMs, DVDs, floppy disks, hard disk drives, etc.), USB keys, flash memory cards, solid state-drives, and tape drives.

In the context of the present specification, a "database" is any structured collection of data, irrespective of its particular structure, the database management software, or the computer hardware on which the data is stored, implemented, or otherwise rendered available for use. A database may reside on the same hardware as the process that stores or makes use of the information stored in the database or it may reside on separate hardware, such as a dedicated server or plurality of servers.

In the context of the present specification, unless expressly provided otherwise, the words "first", "second", "third", etc. have been used as adjectives only for the purpose of allowing for distinction between the nouns that they modify from one another, and not for the purpose of describing any particular relationship between those nouns.

BRIEF DESCRIPTION OF THE DRAWINGS

Non-limiting embodiments of the present technology are described herein with reference to the accompanying drawings; these drawings are only presented herein to explain the essence of the technology and are not intended to limit the scope thereof in any way, where:

FIG. 5 depicts a flowchart diagram of a connection establishment stage of a second method for tunneling the traffic in the he distributed network of FIG. 1, the connection establishment stage being for establishing a p2p connection between a given emitter and a given gateway within the distributed network of FIG. 1, in accordance with certain non-limiting embodiments of the present technology;

FIG. 6A depicts a flowchart diagram of a data transmission stage of the second method, including transmitting outgoing traffic from the given emitter to the given gateway directly, in accordance with certain non-limiting embodiments of the present technology;

FIG. 6B depicts a flowchart diagram of a continuation of the data transmission stage of FIG. 6A, including transmitting incoming traffic from the given gateway to the given emitter directly, in accordance with certain non-limiting embodiments of the present technology;

FIG. 7 depicts a flowchart diagram of a connection switching stage of the second method, including switching a connection between the given emitter and gateway to a backup route through the central server of the distributed network of FIG. 1, in accordance with certain non-limiting embodiments of the present technology;

DETAILED DESCRIPTION

Figure 1:
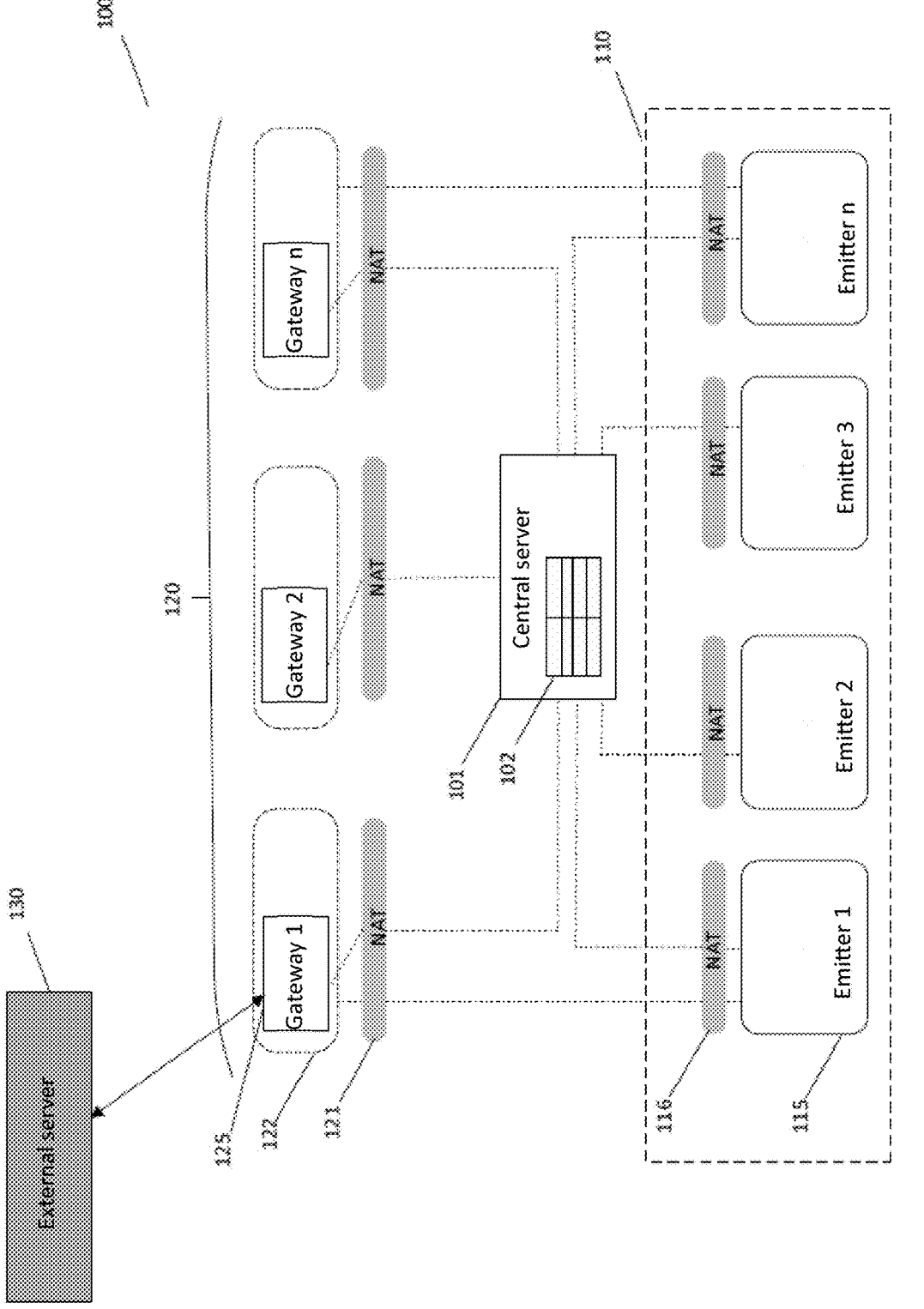
FIG. 1 depicts a schematic diagram of a distributed network, in accordance with certain non-limiting embodiments of the present technology.

The following detailed description is provided to enable a person skilled in the art to implement and use the non-limiting embodiments of the present technology. Specific details are provided merely for descriptive purposes and to give insights into the present technology, and in no way as a limitation. However, it would be apparent to a person skilled in the art that some of these specific details may not be necessary to implement certain non-limiting embodiments of the present technology. The descriptions of specific implementations are only provided as representative examples. Various modifications of these embodiments may become apparent to the person skilled in the art; the general principles defined in this document may be applied to other non-limiting embodiments and implementations without departing from the scope of the present technology.

Non-limiting embodiments of the present technology are directed to methods and systems for accelerated traffic tunneling in a distributed network enabling natting of outgoing traffic packets and transmission thereof to an external IP address so that the sender's IP address would be different from the actual IP address of the device that has sent the traffic packets. At least some non-limiting embodiments of the present technology include implementation of p2p tunneling within the distributed network.

Let's consider the following example: a bank "X" requests a company "G" to provide services in the field of cybersecurity, more specifically, outsource analysis of suspicious content incoming from external resources. In this case, the company "G" can provide the bank with an opportunity to use its polygon. The company "G" provides one or more sandboxes located in the polygon to serve the request of the bank "X". The distributed network of the polygon is designed in such a way that, upon request from the bank "X", a route is built to one or more isolated environments located in polygon, and suspicious traffic from the bank "X" is analyzed in these isolated environments. Tunneling within the distributed network is implemented in such a way that each packet of outgoing traffic is natted at the output from the distributed network of the company "G" to be sent on behalf of the bank "X", that is, with the IP address of bank "X" being indicated as the sender. Thus, an attacker that has sent malicious content to the IP address of the bank "X", for example, a malicious file or a link to a malicious website, as a result of analysis and detection (activation) of this file or clicking on the link, will receive a request at their server from the bank's IP address "X", not from the IP address of the polygon of the company "G". Thus, the server of the attackers will not be able to detect the isolated environment of the company "G" and can thus send fully operating malware thereto, such as a file, which can be subject to further analysis. For example, upon receiving this file, the server of the company "G" can be configured to identify the server of the attackers as being malicious.

As previously mentioned, the polygon can include a plurality of isolated environments (sandboxes) initialized in the distributed network. The isolated environments can be distributed among multiple clients, one of which can be the bank "X". At the output of the distributed network, the data packet originating from each of the isolated environments is natted and sent to an external server (which can potentially be malicious) with an IP address corresponding to the addresses of the network infrastructure of a given company, for example, in this case, the bank "X".

According to certain non-limiting embodiments of the present technology, the infrastructure of the company "G" includes a central server and at least one emitter that are configured to route and analyze potentially malicious traffic entering the local network of the bank "X". The local network of the bank "X" can include at least one gateway, which is an electronic device configured to forward all or part of the traffic for analysis to the infrastructure of the company "G", that is, to the given emitter of the at least one emitter.

According to certain non-limiting embodiments of the present technology, data transmission among nodes of the distributed network may be organized in various ways. In one example, the data transmission can be established through the central server of the infrastructure of the company "G" or directly from the given emitter of the infrastructure of the company "G" to the given gateway in the local network of the company "X", after which the given gateway is configured to perform natting to establish a p2p connection. The present methods and systems are directed to establishing the accelerated tunneling of the traffic from the given emitter to the gateway, while bypassing a transmission of data packets through the central server. However, in order to implement the p2p connection, it is first required to establish a connection via the central server. Therefore, a method for establishing a connection between the given emitter and gateway via the central server will be described first. Further another method for implementing the p2p connection between the given emitter and gateway, bypassing the central server, will be described.

According to certain non-limiting embodiments of the present technology, the central server also may be used to provide operation of the system in a backup mode. The backup mode may be activated if there is a failure resulting, for example, in the peers not having IP addresses for sending requests. The backup mode may comprise routing of the traffic through the central server. In the distributed network, the central server is a gate for peers. The gate in the backup mode is used by peers to transmit packets to a recipient having an IP address which they are not aware of. Therefore, when the given gateway from the local network of the company "X" needs to send a data packet for analysis at one of emitters of the infrastructure of the company "G", the given gateway can send the packet to the central server that, in turn, is configured to transmit the received packet to the corresponding emitter.

With reference to FIG. 1, there is depicted a schematic diagram of the distributed network 100 between a given cybersecurity company, such as the company "G", and a local network of a client company, such as the bank "X" mentioned above, in accordance with certain non-limiting embodiments of the present technology. As shown in FIG. 1, a polygon of emitters 110 for malicious content analysis includes emitters, such as a given emitter 115. A neighbor table 102, which is stored on a central server 101 of the distributed network, includes the information needed to build routes between peers of the distributed network, such as the polygon the polygon of emitters 110 and gateways 120. It is not limited how the neighbor table 102 is implemented, and in some non-limiting embodiments of the present technology, the neighbor table may be implemented similarly to a table of MAC addresses. In one implementation, neighbor tables may also be stored on at least one of a given gateway of the gateways 120 and the given emitter 115 of the polygon of emitters 110.

Further, according to certain non-limiting embodiments of the present technology, each emitter of the polygon of emitters 110, such as the given emitter 115 may comprise an electronic device capable of implementing a given task at hand. For example, in various non-limiting embodiments of the present technology, the given emitter 115 can comprise a personal computer, a laptop, a tablet, a smartphone, and the like. To that end, the given emitter 115 can include some or all components of a computing environment 900, which will be described below with reference to FIG. 9. According to certain non-limiting embodiments of the present technology, the given emitter 115 can be configured to execute an isolated environment (such as a sandbox), which is configured for detecting suspicious content (not depicted). In some non-limiting embodiments of the present technology, the given emitter 115 can be implemented as a computer server, such as Dell™ PowerEdge™ Server running the Microsoft™ Windows Server™ operating system but can also be implemented in any other suitable hardware, software, and/or firmware, or a combination thereof.

Further, according to certain non-limiting embodiments of the present technology, each one of the gateways 120, such as a given gateway 125 is located in a local network 122 of the client company. According to certain non-limiting embodiments of the present technology, the given gateway 125 comprises an electronic device, which can be implemented similarly to the given emitter 115. In some non-limiting embodiments of the present technology, as will be described in detail below, the given gateway 125 can be configured nat the packets of outgoing traffic, that is, replace the sender's IP address (such as that of the given emitter 115) with its own IP address, thereby sending the packets of outgoing traffic on its behalf.

Figure 9:
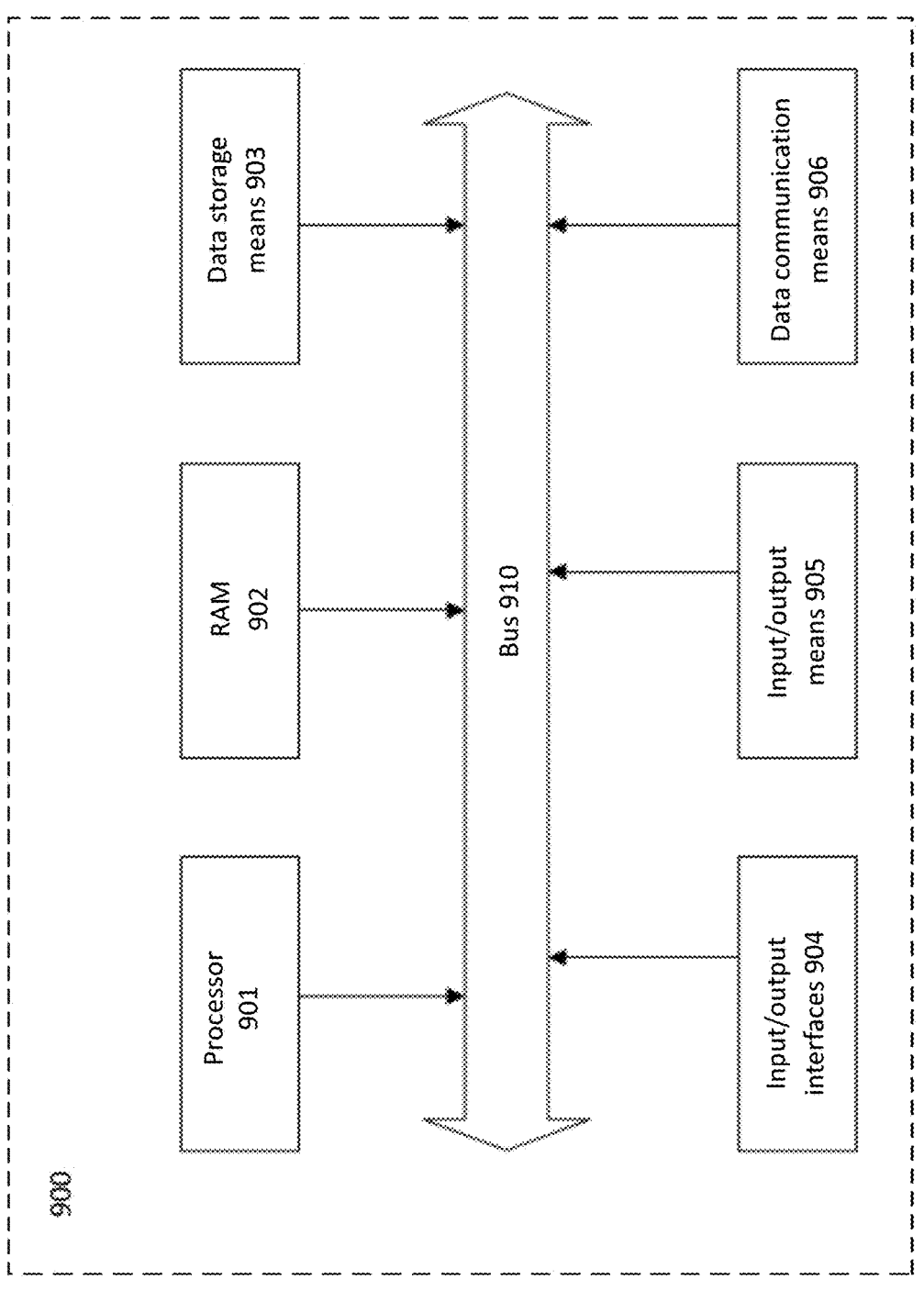
FIG. 9 depicts a schematic diagram of an example computing environment configurable for execution of the stages of the present method of FIGS. 3, 4A, and 4B, 5, 6A, 6B, and 7, in accordance with certain non-limiting embodiments of the present technology.

Further, each one of the central server 101 and the external server 130 can be implemented as a conventional computer server and may comprise some or all of the components of the computing environment 900 schematically depicted in FIG. 9. In a specific non-limiting example, a given one of the central server 101 and the external server 130 is implemented as a Dell™ PowerEdge™ Server running the Microsoft™ Windows Server™ operating system but can also be implemented in any other suitable hardware, software, and/or firmware, or a combination thereof. In the depicted non-limiting embodiments of the present technology, the given one of the central server 101 and the external server 130 is a single server. In alternative non-limiting embodiments of the present technology (not depicted), the functionality of the given one of the central server 101 and the external server 130 may be distributed and may be implemented via multiple servers.

According to certain non-limiting embodiments of the present technology, the routing of the traffic in the distributed network 100 is organized such that none of the gateways 120, can communicate with other gateways. Similarly, none of the polygon 110 emitters can communicate with other emitters. Further, in some non-limiting embodiments of the present technology, a given route can connect the given emitter 115 and the given gateway 125 and back through the central server 101.

Returning to the example above where the client company is the bank "X", according to certain non-limiting embodiments of the present technology, the routing can be organized so that the given gateway 125, located in the local network 122 of the bank "X", is not able to communicate with other ones of the gateways 120, which, for example, may belong to other client companies of the cybersecurity company. In general, the given gateway 125 is technically able to send and receive data from any emitter of the polygons of emitters 110 and from the central server 101. However, in some non-limiting embodiments of the present technology, the given gateway 125 can be uniquely associated only with the given emitter 115; and as such, the traffic from the given gateway 125 can be routed, within the distributed network 110, only to the given emitter 115. Therefore, within the framework of the considered non-limiting example, the route for the given gateway 125 of bank "X" is configured so that data is transmitted from the given emitter 115 to the given gateway 125.

It should be noted that certain non-limiting embodiments of the present technology are based on a premise that the central server 101 of the distributed network 100 has a public IP address. Further, in some non-limiting embodiments of the present technology, the given gateway 125 may be located behind a second natting procedure 121 and not have a public IP address. Likewise, the given emitter 115 may be located behind a first natting procedure 116 and not have a public IP address.

In alternative non-limiting embodiments of the present technology, both the given gateway 125 and the given emitter 115 may have their own public IP addresses and may not be located behind a nat.

Next, traffic routing between the client company, such as the bank "X", and the cybersecurity company, such as the company "G" mentioned above in the distributed network 100 will be described in detail.

First, a request to the external server 130, located outside of the distributed network 100, can be generated at the given emitter 115. This request to the external server 130 can be, for example, triggered by the given emitter 115 in response to receiving an external link from an e-mail received from the external server 130. As the external server 130 is potentially an attacker's server, it may be required to analyze the content received therefrom for maliciousness. Thus, according to certain non-limiting embodiments of the present technology, the given emitter 115, executing the isolated environment, can be configured to send the request as a packet of outgoing data to the central server 101. Further, the central server 101 can be configured to forward the packet of outgoing data to the given gateway 125. The given gateway 125 replaces the IP address of the sender to the IP address of the local network 122 of the client company (or to the IP address belonging to the network, such as that of the given gateway 125 itself) 122 in which the given gateway 125 is located and forwards the packet to the external server 130. Due to the replacement described, the IP address of the packet's sender (which can be analyzed on the external server 130) will have nothing in common with the IP address of the given emitter 115, so the attacker will not know that the opening of the letter and clicking on the link, for example, triggered the transmission of the packet to the external server 130, has occurred in the isolated environment of the given emitter 115, and not within one of the devices from the local network 122 attacked.

Thus, when the external server 130 receives the packet, it is the IP address of the local network 122 (such as that of the given gateway 125) that the external server 130 will determine as the sender's address. Due to the replacement of the IP address, the distributed network 100 will imitate the local network 122 of the client company for the attacker. The external server 130, if it belongs to the attackers, sends malicious content in response to a request (following a link), for example, a link in an email that has been clicked on. An incoming traffic packet, which may contain malicious content, will then be transmitted to the given gateway 125. The given gateway 125 will forward the packet to the central server 101. The central server 101 will forward the packet to the given emitter 115. Thus, the given emitter 115 will receive the packet of incoming traffic potentially containing malicious content. The given emitter 115 can be configured to unpack the packet in its isolated environment for further analysis thereof, without posing any threat to the gateways 120 and to the local network 122.

In the above example, the following occurs. An email from an unknown sender can be received in the bank "X" local network. The email may contain a link for downloading the file. The email is then redirected for analysis to an isolated environment installed, for example, on the given emitter 115. In response, the given emitter 115 can be configured trigger, in the isolated environment, clicking on the link contained in the email, resulting in a request being sent to the external server 130 to download the file. The request is automatically forwarded first to the central server 101, then, for example, to the given gateway 125. The given gateway 125 installed in the local network 122 under attack is configured to replace the IP address of the given emitter 115 with an IP address of the local network 122 of the bank "X", such as with its own IP address, for example, and forward the packet to the external server 130, possibly belonging to the attacker.

Further, the external server 130, upon receipt of the packet from the given gateway 125, can be configured to determine, in the packet, the IP address of the local network 122 of the bank "X" specified as being the sender of the packet. And in response to the request received, the external server 130 can thus be configured to transmit a package containing a potentially malicious file. The incoming data packet is received at the given gateway 125 and sent further to the given emitter 115 not directly, but through a hoop, which functions are performed by the central server 101.

According to certain non-limiting embodiments of the present technology, forwarding packets between the network actors: the given emitter 115, the central server 101 and the given gateway 125, can be executed by traffic tunneling, that is, repackaging of the packet at several data transferring levels. Certain non-limiting embodiments of the present technology are directed to two data transferring interfaces over an Internet connection, including a WireGuard level and a Generic Routing Encapsulation (GRE) level. In the context of the present specification, the WireGuard and GRE denote both communication protocols and software for implementing these protocols. Both types of software have interfaces through which they are configured.

Given the architecture and examples provided hereinabove, it is now possible to implement a first method 300 (described below with reference to FIGS. 3, 4A, and 4B) of tunnelling the traffic in a distributed network, such as the distributed network 100 described above with reference to FIG. 1. According to certain non-limiting embodiments of the present technology, the first method 300 includes three stages: a preparation stage 302 (described below with reference to FIG. 3), a first stage 400 (described below with reference to FIG. 4A), and a second stage 402 (described below with reference to FIG. 4B).

Figure 3:
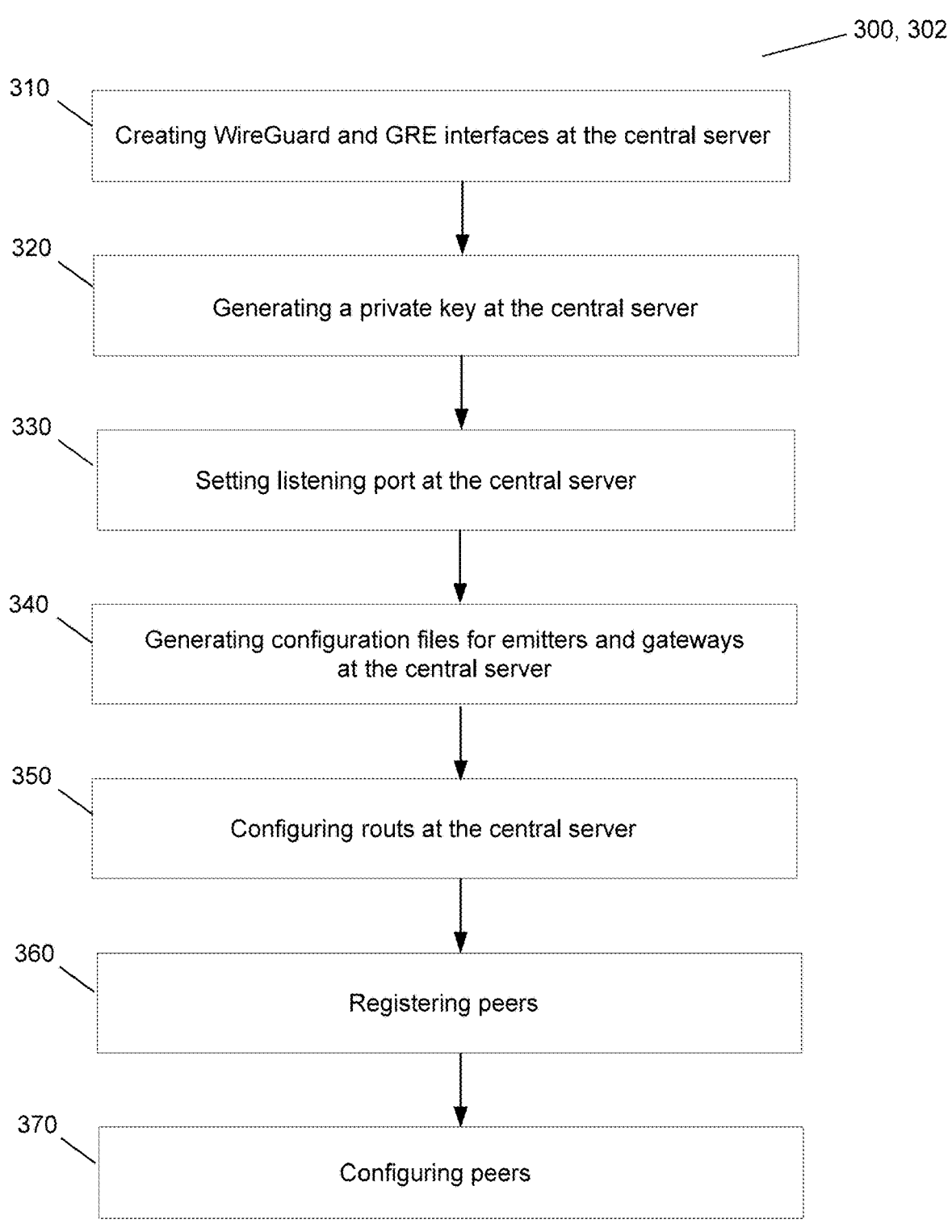
FIG. 3 depicts a flowchart diagram of a preparation stage of a first method of tunneling the traffic in the distributed network of FIG. 1, in accordance with certain non-limiting embodiments of the present technology.

With reference to FIG. 3, there is depicted a flowchart diagram of the preparation stage 302 of the first method 300 of tunneling the traffic in the distributed network 100 via the central server 101, in accordance with certain non-limiting embodiments of the present technology. As mentioned above, different steps of the preparation stage 302 can be executed by a processor 901 the respective one of the central server 101, given emitter 115, and the given gateway 125.

At the preparation stage 302, according to certain non-limiting embodiments of the present technology, each one of the given emitter 115 and the given gateway, 125 can be configured to set up the interfaces and routes therebetween; and the central server 101 can be configured to register the IP addresses of the given emitter 115 and the given gateway 125 in the neighbor table 102. Now, the preparation stage 302 will be described in greater detail.

Step 310: Creating Wireguard and GRE Interfaces at the Central Server

The preparation stage 302 commences at step 310 where the central server 101 is configured to create two interfaces, WireGuard and GRE. The GRE interface is specified as running on top of the WireGuard interface. With this setting, packets in the distributed network 100 are encapsulated in the following order: UDP, WireGuard, GRE.

The preparation stage 302 hence proceeds to step 320.

Step 320: Generating a Private Key at the Central Server

At step 320, the central server 101 can be configured to generate a private key on the WireGuard interface.

The preparation stage 302 of the first method 300 hence advances to step 330.

Step 330: Setting Listening Port at the Central Server

At step 330, according to certain non-limiting embodiments of the present technology, the central server 101 can be configured to set, for the WireGuard interface, using the appropriate command, a listening port that indicates which server port of the central server 101 listens for incoming connections.

The preparation stage 302 of the first method 300 hence advances to step 340.

Step 340: Generating Configuration Files for Emitters and Gateways at the Central Server At step 340, according to certain non-limiting embodiments of the present technology, the central server 101 can be configured to generate configuration files for the central server 101 itself, as well as for all emitters of the polygon of emitters 110 and for all of the gateways 120.

Figure 2:
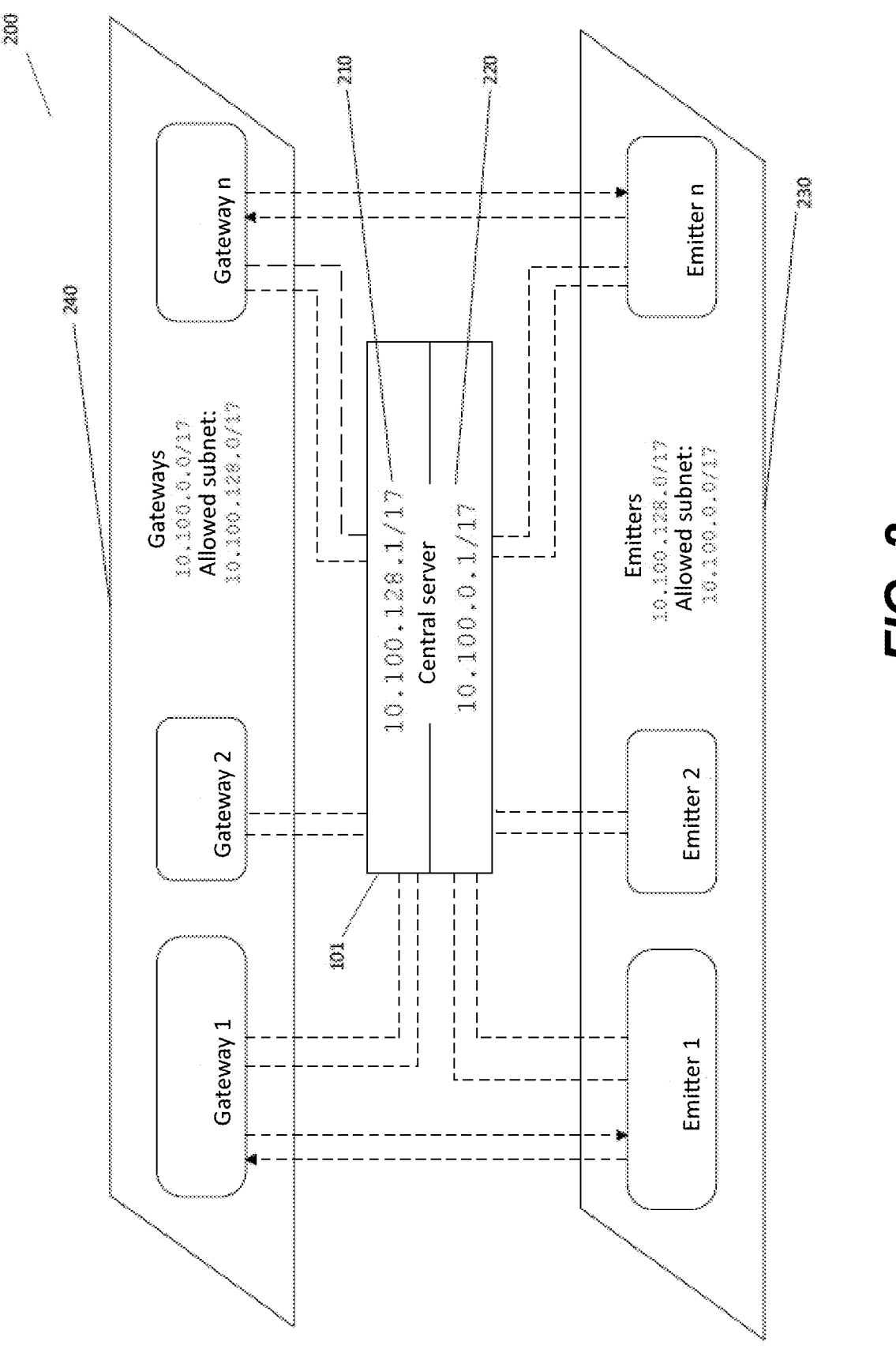
FIG. 2 depicts a schematic diagram of routing traffic within the distributed network of FIG. 1, in accordance with certain non-limiting embodiments of the present technology.

More specifically, according to certain non-limiting embodiments of the present technology, a given configuration file generated by the central server 101 includes the IP addresses of the central server 101 for the WireGuard and GRE interfaces. As schematically depicted in FIG. 2, at the WireGuard level, the central server 101 has two IP addresses, a first IP address 210 of which is intended for interaction with the gateways 120, and a second IP address 220, which is intended for interaction with the polygon of emitters 110. In the example of FIG. 2, at the WireGuard level, the first IP address is 10.100.128.1/17 is assigned to the central server 101 to interact with the gateway subnet 240 of the gateways 120, which has the IP address 10.100.0.0/17, at the same time, the central server 101 is assigned with the second IP address 10.100.0.1/17 to interact with an emitter subnet 230 of the polygon of emitters 110, which has an IP address 10.100.128.0/17.

It should be noted that devices that are, for example, certain ones of the gateways 120 located at the WireGuard level in the same subnet 240 may physically be located in different cities or even different countries. Likewise, certain ones of the polygon of emitters 110 located at the WireGuard level on the same subnet 230 can be located anywhere in the world.

Further, according to certain non-limiting embodiments of the present technology, the given configuration file can further include information on the subnets of the distributed network 100. Subnets are lists of IP addresses from which peers, that is, emitters and gateways, will be assigned IP addresses when they are subsequently configured. Specification of subnets in the given configuration file of the central server 101 determines the ability of the central server 101 to receive packets from the specified subnet and transmit packets to the specified subnets. It should be noted that the polygon of emitters 110 and the gateways 120 may be organized indifferent subnets at the WireGuard level, respectively. For example, as can be appreciated from FIG. 2, the polygon of emitters 110 belong to the emitter subnet 230, and the gateways 120 belong to the gateway subnet 240. Thus, assigning, by the central server 101, different IP addresses from non-overlapping subnets to each one of the polygons emitters 110 and the gateways 120 at the Wire-Guard level allows to configure routes so that a given one of the polygon of emitters 110 can transmit packets to the gateways 120 and cannot transmit packets, for example, to other emitters. For the same reason, the gateways 120 will be able to transmit packets to respective ones of the polygon of emitters 110 and will not be able to transmit packets to other ones of the gateways 120. This is necessary so that different owners of different local networks, for example, competing banks, cannot access each other's local network and nat through competitors' gateways.

Also, in some non-limiting embodiments of the present technology, the given configuration file can also specify a UDP port on which the central server 101 listens for incoming WireGuard packets.

Thus, the preparation stage 302 of the first method 300 advances to step 350.

Step 350: Configuring Routs at the Central Server

At step 350, the central server 101 can be configured to perform route configuration at the WireGuard level and at the GRE level. As noted above, according to certain non-limiting embodiments of the present technology, the GRE level runs on top of the WireGuard level, which, in turn, runs on top of the UDP level. This means that, in these embodiments, all packets are processed firstly at the UDP level, then at the WireGuard level, and only then all packets are processed at the GRE level.

As further shown in FIG. 2, at the WireGuard level, the routes on the central server 101 are configured in such a way that all packets that the central server 101 sends to the emitter subnet 230 are sent from the second IP address 220. Similarly, all packets that the central server 101 sends to the gateway subnet 240 are sent from the first IP address 210.

At the GRE level (not shown in FIG. 2), according to certain non-limiting embodiments of the present technology, the central server 101 is assigned a single IP address. Similarly, in some non-limiting embodiments of the present technology, the central server 101 can be configured to assign a single respective address to each of the gateways 120 and the polygon of emitters 110. Also, in some non-limiting embodiments of the present technology, and at the GRE level, the IP addresses of the gateways 120 and the polygon of emitters 110 are not organized into different subnets as at the WireGuard level, they all are on the same subnet.

Thus, the preparation stage 302 of the first method 300 advances to step 360.

Step 360: Registering Peers

At step 360, the central server 101 can be configured to register peers, i.e., emitters and gateways, by sending requests to a management interface. The management interface is an interaction interface for managing peers in the distributed network 100: it allows to add, remove, and get information about current peers. In order to register each peer through the management interface, the central server 101 can be configured to execute the following actions:

generating a private key for a given peer, generating a public key based on the private key, allocating IP addresses for the given peer at the Wire-Guard level, adding pairs from the public key and the given peer's IP address to the WireGuard interface, allocating IP addresses for the given peer at the GRE level, adding correspondences of the IP addresses of the given peer at the WireGuard and GRE levels the neighbor table, adding a correspondence of the public key of the IP addresses of the given peer at the WireGuard and GRE levels to a correspondence database.

According to certain non-limiting embodiments of the present technology, the central server 101 can be configured to execute the above-listed actions by running the given configuration file from time to time, for example, according to a predetermined schedule.

In response to the request to register the given peer on the central server 101, the central server 101 can be configured to generate a respective configuration file including a private key, a pair of IP addresses at the WireGuard and GRE levels, information about the central server 101, including its public key, as well as the address and UDP port on which the central server 101 listens for incoming WireGuard packets. Further, the central server 101 can be configured to transmit the respective configuration file to the given peer of the distributed network 100. In response to receiving the respective configuration file, the given peer can be configured to execute the respective configuration file.

Thus, the preparation stage 302 of the first method 300 advances to step 370.

Step 370: Configuring Peers

At step 370, the peers of the distributed network 100, i.e., the polygon of emitters 110 and the gateways 120, can be configured to execute their respective configuration files for configuration thereof. To do this, in some non-limiting embodiments of the present technology, the given peer can be configured to execute a wg-quick utility through a script, which raises the WireGuard interface and configures it in accordance with the settings saved in the respective configuration file.

The example of an emitter configuration file, such as that of the given emitter 115, is provided below.

[Interface]
PrivateKey=KBUsKrU/
7hfs9e40hetklGg9VIlDIv9SU4PNybpH7mU=
Address=10.100.128.2/17
PostUp=ip link add mgre_%i type gre key 0xffffffe dev
%i
PostUp=ip address add 10.101.0.4/16 dev mgre_%i
PostUp=ip link set mgre_%i up
PostUp=ip neighbour replace 10.101.0.1 lladdr
10.100.0.1 dev mgre_%i
PostUp=ip route replace 10.101.0.0/16 via 10.101.0.1 dev
mgre_%i
PostUp=iptables --insert INPUT --protocol udp --dport
$(wg show %i listen-port) --jump ACCEPT
PostUp=iptables --insert INPUT --in-interface %i --jump
ACCEPT
PostUp=iptables --insert INPUT --in-interface mgre_%i
--jump ACCEPT
PostUp=iptables --insert FORWARD --in-interface
mgre_%i --jump ACCEPT
PostUp=iptables --insert FORWARD --out-interface
mgre_%i --jump ACCEPT
PreDown=iptables --delete FORWARD --out-interface
mgre_%i --jump ACCEPT
PreDown=iptables --delete FORWARD --in-interface
mgre_%i --jump ACCEPT
PreDown=iptables --delete INPUT --in-interface
mgre_%i --jump ACCEPT
PreDown=iptables --delete INPUT --in-interface %i
--jump ACCEPT
PreDown=iptables --delete INPUT --protocol udp --dport
$(wg show %i listen-port) --jump ACCEPT
PreDown=ip link delete mgre_%i
[Peer]
Core server
PublicKey=/HjUlZdftSjf+
B8iqKz3ypJVNhqyaiqMMOLVhWSw4n0=
AllowedIPs=10.100.0.0/17

PersistentKeepAlive=5
The example of a gateway configuration file, such as that of the given gateway 125 is provided below.
[Interface]
PrivateKey=wDoY6RX74y+
BIO8E08OxGlgj5YpurSv8kZKGqbwsB28=Address=
10.100.0.2/17
PostUp=ip link add mgre_%i type gre key 0xffffffe dev
%i
PostUp=ip address add 10.101.0.2/16 dev mgre_%i
PostUp=ip link set mgre_%i up
PostUp=ip neighbour replace 10.101.0.1 lladdr
10.100.128.1 dev mgre_%i
PostUp=ip route replace 10.101.0.0/16 via 10.101.0.1 dev
mgre_%i
PostUp=iptables --insert INPUT --protocol udp --dport
$(wg show %ilisten-port) --jump ACCEPT
PostUp=iptables --insert INPUT --in-interface %i --jump
ACCEPT
PostUp=iptables --insert INPUT --in-interface mgre_%i
--jump ACCEPT
PostUp=iptables --insert FORWARD --in-interface
mgre_%i --jump ACCEPT
PostUp=iptables --insert FORWARD --out-interface
mgre_%i --jump ACCEPT
PostUp=iptables --table nat --insert POSTROUTING
--source 10.101.0.0/16 --jump MASQUERADE
PreDown=iptables --table nat --delete POSTROUTING
--source 10.101.0.0/16 --jump MASQUERADE
PreDown=iptables --delete FORWARD --out-interface
mgre_%i --jump ACCEPT
PreDown=iptables --delete FORWARD --in-interface
mgre_%i --jump ACCEPT
PreDown=iptables --delete INPUT --in-interface
mgre_%i --jump ACCEPT
PreDown=iptables --delete INPUT --in-interface %i
--jump ACCEPT
PreDown=iptables --delete INPUT --protocol udp --dport
$(wg show %i listen-port) --jump ACCEPT
PreDown=ip link delete mgre_%i
[Peer]
Core server
PublicKey=/HjUlZdftSjf+
B8iqKz3ypJVNhqyaiqMMOLVhWSw4n0=
AllowedIPs=10.100.128.0/17
Endpoint=poligon.g.com:51820
PersistentKeepAlive=5
According to certain non-limiting embodiments of the present technology, by executing the wg-utility for the emitter configuration file, the given emitter 115 can be configured to:
create a WireGuard interface,
assign and specify a private key in the respective configuration file,
assign an IP address to the WireGuard interface,
add the central server 101 as a peer, located at the second IP address 220 specified in the respective configuration file, with the public key specified and the subnet of IP addresses allowed;
create GRE interface that is run on top of the WireGuard interface created earlier.
assign the IP address specified to the GRE interface,
add a correspondence between the IP addresses of the central server 101 at the WireGuard and GRE levels to the neighbor table,
establish routes to all addresses in the GRE subnet through the hoop (central server 101), and add firewall rules that allow packets to be received and sent through the created WireGuard and GRE interfaces.

Similarly, the given gateway 125 can be configured to use the w-g utility for performing self-configuration. However, in some non-limiting embodiments of the present technology, additional step can be executed, including: adding firewall rules natting packets that come from the GRE subnet. When configuring the given gateway 125, the respective configuration file can be launched in the local network 122 of the client company, on the computing device, for example, a laptop, which acts as the given gateway 125.

The preparation stage 302 of the first method 300 hence terminates.

Figure 4A:
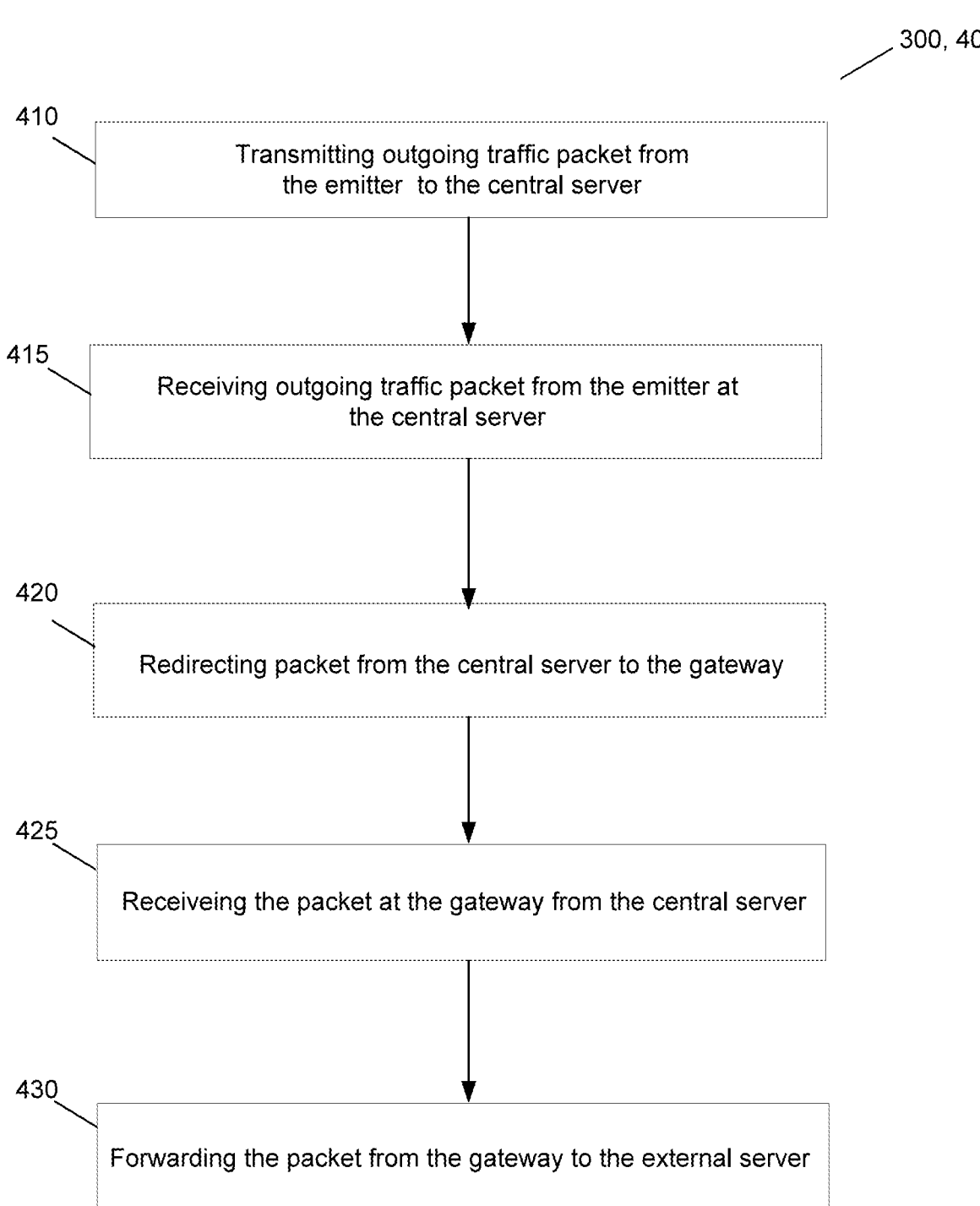
FIG. 4A depicts a flowchart diagram of a first stage of the first method, including transmitting outgoing traffic from the distributed network to an external server, in accordance with certain non-limiting embodiments of the present technology.

Further, the first method 300 proceeds to execute the first (working) stage, such as a first stage 400, flowchart diagram of which is depicted in FIG. 4A, in accordance with certain non-limiting embodiments of the present technology.

Step 410: Transmitting Outgoing Traffic Packet from the Emitter to the Central Server The first stage 400 commences at step 410 with the given emitter 115 transmitting an outgoing traffic packet to the central server 101. This outgoing traffic packet contains a payload that is destined for the external server 130. For example, the given emitter 115 can be configured to generate the outgoing traffic packet for the external server 130 in response to receiving therefrom and further activating (such as opening, launching, and the like) a link or a document that may be malicious.

According to certain non-limiting embodiments of the present technology, prior to transmitting, the given emitter 115 can be configured to encapsulate the outgoing traffic packet so that the outgoing traffic packet has the following form:

a payload level;
  a GRE level, where: as a source IP address the IP address of the given emitter 115 is specified at the GRE level; as a destination IP address the IP address of the external server 130 is specified;
  a WireGuard level, where: as the source IP address, the IP address of the given emitter 115 is specified at the WireGuard level; as the recipient IP address, the IP address of the given gateway 125, associated with the given emitter 115, is specified at the WireGuard level;
  a UDP layer, where: in a sender field of a UDP packets header, the WireGuard port of the given emitter 115 is specified, and in a receiver field, the WireGuard port of the central server 101 is specified; and
  an Internet connection level, where: the local IP address of the given emitter 115 is specified as the source IP address; and the public IP address of the central server 101 is specified as the destination IP address.

In some non-limiting embodiments of the present technology, as shown in FIG. 1, the given emitter 115 may be located behind the first natting procedure 116, and thus, and may not have a public IP address. In this case, the given emitter 115 can be configured to specify its local IP address as the sender IP address in the outgoing traffic packet at the Internet connection level. And when the packet is sent, the nat is performed and the local IP address of the given emitter 115 specified as the source IP address at the Internet connection level, is replaced with the public IP address of the given emitter 115.

However, in other non-limiting embodiments of the present technology, the given emitter 115 may have a public IP address. In this case, the given emitter 115 may be configured to specify its public IP address as the sender IP address at the level of the Internet connection, and natting is not performed.

In the example provided above, an analysis of data received from the local network 122 of the bank "X" is performed at the given emitter 115. More specifically, an email sent by an unknown sender to an employee of the bank "X" is redirected for the analysis to the company "G", namely, to an isolated environment on the given emitter 115. On the given emitter 115, the outgoing traffic packet including a link (request) to the external server 130 is generated, and the execution of this request can mean downloading a potentially malicious file from the external server 130. The request to the external server 130 is formed on the given emitter 115 to have the potentially malicious file transmitted in response to the request from the external server 130 arrived at the given emitter 115 and not to the user's machine on the local network 122, because the given emitter 115 is configured to analyze such files.

The first stage 400 of the first method 300 hence proceeds to step 415.

Step 415: Receiving Outgoing Traffic Packet from the Emitter at the Central Server At step 415, according to certain non-limiting embodiments of the present technology, the central server 101 is configured to receive the outgoing traffic packet from the given emitter 115. In response to receiving the outgoing traffic packet, the central server 101 decapsulates it and identifies the destination IP address at the WireGuard level. In other words, at step 415, the central server 101 of the company "G" receives the next data packet from the emitter that was previously configured to analyze suspicious traffic coming from the local network 122 of the bank "X".

The first stage 400 of the first method 300 hence proceeds to step 420.

Step 420: Redirecting Packet from the Central Server to the Gateway

At step 420, in response to receiving the outgoing traffic packet from the given emitter 115, in some non-limiting embodiments of the present technology, the central server 101 can be configured to: (i) identify the IP address of the given gateway 125 as a destination at the WireGuard level of the outgoing traffic packet; and (ii) forward outgoing traffic packet to the given gateway 125. To that end, the central server 101 can be configured to encapsulate the outgoing traffic packet so as the outgoing traffic packet has the following form:

the payload level;
  the GRE level, where: the IP address of the given 115 is specified as the source IP address at the GRE level, the IP address of the external server 130 is specified as the destination IP address;
  the WireGuard layer, where: the IP address of the given emitter 115 is specified as the source IP address at WireGuard layer, the IP address of the given gateway 125 is specified as the destination IP address at the WireGuard layer; and
  the Internet connection level, where: the public IP address of the central server 101 is specified as the sender IP address, the IP address of the given gateway 125 is specified as the destination IP address.

In some non-limiting embodiments of the present technology, as shown in FIG. 1, the given gateway 125 may be located behind the second natting procedure 121 and may not have its public IP address. In this case, in the outgoing traffic packet at the level of the Internet connection, the public IP address of the given gateway 125 is specified as the destination IP address, and denatting is performed when the packet is transmitted.

In other non-limiting embodiments of the present technology, the given gateway 125 may have a public IP address. In this case, this public IP address is specified as the sender at the Internet connection level and no denatting is further performed.

In other words, at step 420, the central server 101 of the company "G" redirects the request received from the given emitter 115, which was configured to process suspicious traffic of the bank "X", to the given gateway 125 of the bank "X", located in the local network 122 of this bank, for the IP address replacement.

The first stage 400 of the first method 300 hence advances to step 425.

Step 425: Receiving the Packet at the Gateway from the Central Server

At step 425, according to certain non-limiting embodiments of the present technology, the central server 101 can be configured to transmit the outgoing traffic packet, encapsulated at step 420, to the given gateway 125; and the given gateway 125 can be configured to receive it for further transmitting the outgoing traffic packet to the external server 130. To that end, according to certain non-limiting embodiments of the present technology, the given gateway can be configured to: (i) decapsulate the outgoing traffic packet; (ii) identify the destination IP address at the WireGuard layer of the packet; and (iii) identify the destination IP address at the GRE layer.

In the example provided at step 420, the given gateway 125, located in the local network 122 of bank "X, where the addresses mentioned are identified. can be configured to receive, along with the data containing both the payload (request to the external server 130), the sender and the recipient IP addresses at the WireGuard and GRE levels are received from the central server 101 of company "G".

The first stage 400 hence advances to step 430.

Step 430: Forwarding the Packet from the Gateway to the External Server

At step 430, in some non-limiting embodiments of the present technology in response to identifying the IP address of the external server 130 specified as the destination IP address at the GRE level of the outgoing traffic packet received, the given gateway 125 can be configured to forward, on behalf thereof, the outgoing traffic packet to the external server 130. In some non-limiting embodiments of the present technology, at the same time, the given gateway 125 can be configured to nat the outgoing traffic packet in such a way that the it has the following configuration:

the payload level;
    the Internet connection level, where: the IP address of the given gateway 125 is specified as the source IP address, and the IP address of the external server 130 is specified as the destination IP address.

In some non-limiting embodiments of the present technology, the given gateway 125 may be located behind the second natting procedure 121 and not have its own public IP address. In these embodiments, in the outgoing traffic packet at the level of the Internet connection, the local IP address of the given gateway 125 is indicated as the destination IP address, and the natting is further performed by the given gateway 125 prior to transmitting the outgoing traffic packet to the external server 130.

In other non-limiting embodiments of the present technology, the given gateway 125 may have its own public IP address. In these embodiments, this public IP address is specified as the sender IP address at the level of the Internet connection, and the natting is not thus performed.

In other words, at step 425, the natting can be performed on the given gateway 125 installed in the network 122 of the bank "X". As a result of the natting on the given emitter 115, where the initial request was formed, the IP address of the given gateway 125 which occupies the address location of the network 122 of the bank "X" is specified instead of the IP-address of the company "G". Thus, the external server 130, upon receiving the outgoing traffic packet, will identify the IP address of the given gateway 125 as belonging to the attacked local network 122, and not that of the given emitter 115, and will perform the expected action, for example, sending an incoming traffic packet, which may include malicious content, such as a malicious file.

Figure 4B:
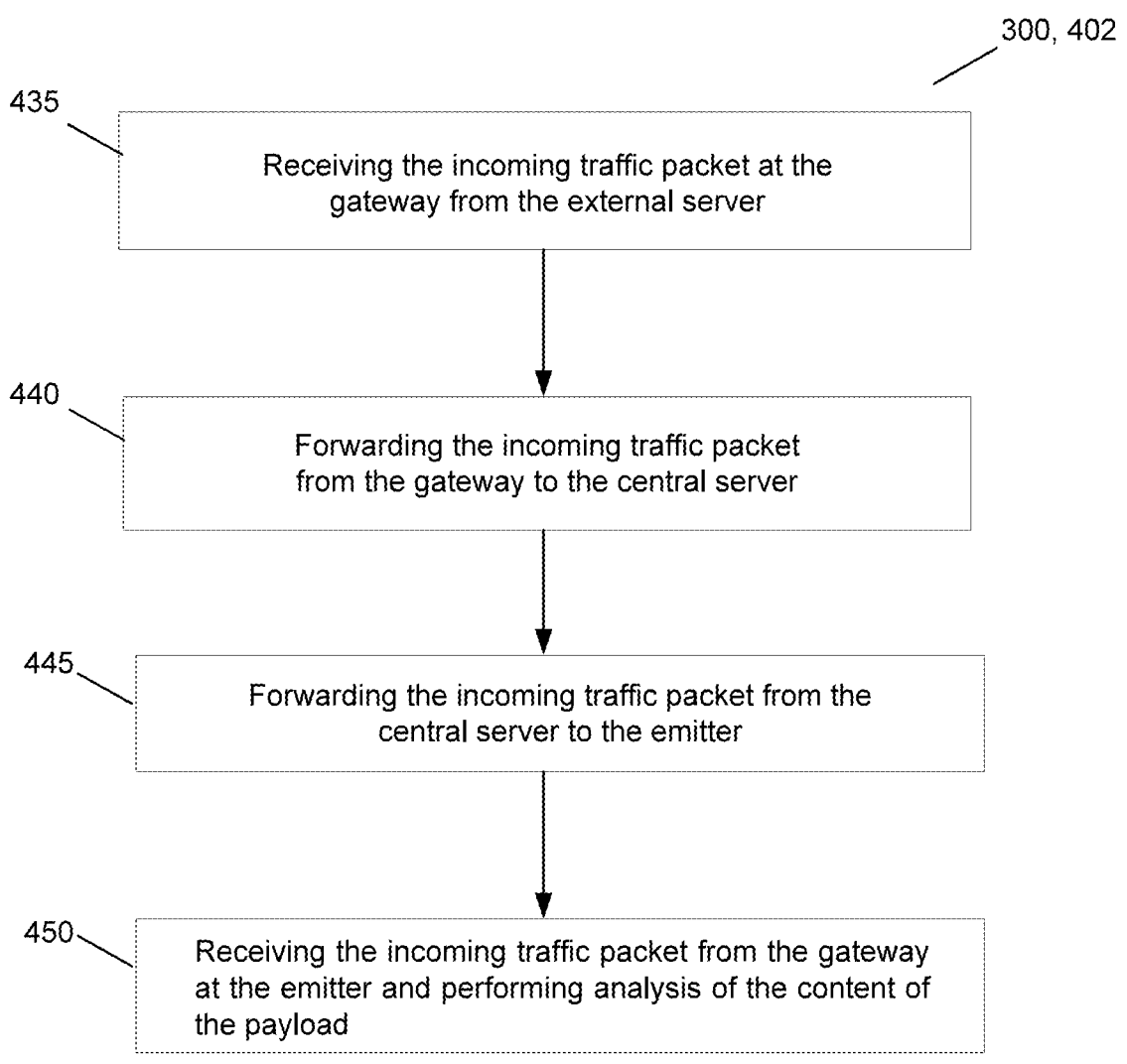
FIG. 4B depicts a flowchart diagram of a second stage of the first method, including transmitting incoming traffic from the external server to the distributed network, in accordance with certain non-limiting embodiments of the present technology.

The first stage 400 hence terminates, and the first method 300 proceeds to a second stage 402, a flowchart of which is depicted in FIG. 4B, in accordance with certain non-limiting embodiments of the present technology.

Step 435: Receiving the Incoming Traffic Packet at the Gateway from the External Server At step 435, according to certain non-limiting embodiments of the present technology, the given gateway 125 can be configured to receive the incoming traffic packet from the external server 130. According to certain non-limiting embodiments of the present technology, the incoming traffic packet can have following configuration:

the payload level;
    the Internet connection level, where: the source IP address is the IP address of the external server 130, and the destination IP address is the IP address of the given gateway 125.

The second stage 402 of the first method 300 thus proceeds to step 440.

Step 440: Forwarding the Incoming Traffic Packet from the Gateway to the Central Server At step 440, according to certain non-limiting embodiments of the present technology, the given gateway 125 can be configured to forward the incoming traffic packet to the central server 101. In order to that, the given gateway 125 can be configured to submit a query to the neighbor table and receives the IP address of the given gateway 125 at the GRE level, that is, the IP address of the central server 101 at the GRE level. Next, the given gateway 125 can be configured to access the neighbor table to obtain the first IP address 210 of the central server 101 at the WireGuard level.

The second stage 402 of the first method 300 hence advances to step 445.

Step 445: Forwarding the Incoming Traffic Packet from the Central Server to the Emitter At step 445, according to certain non-limiting embodiments of the present technology, the central server 101 can be configured to transmit the incoming traffic packet to the given emitter 115. To do this, in some non-limiting embodiments of the present technology, the central server 101 can be configured to encapsulate the incoming traffic packet so as to have:

the payload level;
    the GRE level, where: as the source IP address, the IP address of the external server 130 is specified; as the destination IP address, the IP address of the given emitter 115 is specified at the GRE level;
    the WireGuard level, where: as the source IP address, the IP address of the given gateway 125 is specified at the WireGuard level; as the destination IP address, the IP address of the given emitter 115 is specified at the WireGuard level; and the Internet connection level, where: as the source IP address, the IP address of the central server 101 is specified; as the destination IP address, the public IP address of the given emitter 115 is specified.

In the above example, in steps 435-445, the given gateway 125 is configured to: receive, from the external server 130, the potentially malicious file; forward, via the central server 101, the potentially malicious file to the cybersecurity company "G" for analysis, where the potentially malicious file is further forwarded to the given emitter 115.

Thus, the second stage 402 of the first method 300 proceeds to step 450.

Step 450: Receiving the Incoming Traffic Packet from the Gateway at the Emitter and Performing Analysis of the Content of the Payload At step 450, according to certain non-limiting embodiments of the present technology, the given emitter 115 is configured to receive, from the central server 101, the incoming traffic packet; and analyze the content of the incoming traffic packet for maliciousness. For example, in some non-limiting embodiments of the present technology, to that end, the given emitter 115 can be configured to: (i) activate (that is launch, for example) a potentially malicious file contained in the payload of the incoming traffic packet; and identify and analyze actions performed by the potentially malicious file in the isolated environment.

Further, according to certain non-limiting embodiments of the present technology, the isolated environment can be configured to analyze the actions executed by the so activated potentially malicious file to determine whether it is malicious or harmless. Further, if the analysis showed that the file is safe, in some non-limiting embodiments of the present technology, the given emitter 115 can be configured to: (i) mark then the email including the link to this file as being safe; and (ii) deliver this email to the addressee, an employee of the bank "X", such as that associated with the given gateway 125.

The second stage 402 and the first method 300 hence terminate.

Now, there will be described a second method 500 (described below with reference to FIGS. 5 to 7) of tunneling traffic within the distributed network 100 via a peer-to-peer connection (p2p), that is, via a direct connection between the given emitter and gateway 115, 125, bypassing the central server 101.

According to certain non-limiting embodiments of the present technology, the second method 500 comprises three stages: a connection establishment stage 502 (described below with reference to FIG. 5); a data transmission stage 600 (described below with reference to FIGS. 6A and 6B); and a connection switching stage 700 (described below with reference to FIG. 7). The connection establishment stage 502 of the second method 500 will now be described.

With reference to FIG. 5, there is depicted a flowchart diagram of a connection establishment stage 502 of a second method 500 for establishment of the p2p connection between the given emitter 115 and the given gateway 125 of the distributed network 100. Different steps of the connection establishment stage 502 can be executed by a respective one of the given emitter 115.

Step 510: Transmitting, to the Central Server, a Request for Receiving a Gateway Data from a Given Gateway of the at Least One Gateway, the Request Comprising an IP Address of the Given Gateway at the Wireguard Level, a Public Key, a UDP Address The connection establishment stage 502 commences at step 510 with the given emitter 115 being configured to transmit, to an internal API of the central server 101, the GRE IP address of the given gateway 125 and a request for receiving the gateway data of the given gateway 125. According to certain non-limiting embodiments of the present technology, the gateway data of the given gateway 125 can include: the WireGuard IP address, the public key and the UDP address used by the given gateway 125 for connection to the central server 101.

Further, after receiving the requested information, the given emitter 115 can be configured to add the given gateway 125 as a peer on the WireGuard interface of the given emitter 115.

The connection establishment stage 502 hence advances to step 520.

Step 520: Transmitting, to the Central Server, an Address Resolution Protocol (ARP) Probe, the ARP Probe being Indicative of Whether the Given Emitter is Ready to Establish a P2P Connection with the Given Gateway At step 520, according to certain non-limiting embodiments of the present technology, the given emitter 115 can be configured to transmit an analogue of a broadcast ARP probe to the WireGuard IP address of the central server 101, indicating REQUEST_ENABLE value in OPERATION field. This indicates that the given emitter 115 is ready to establish the p2p connection with the given gateway 125.

The connection establishment stage 502 hence advances to step 530.

Step 530: Receiving the ARP Probe from the Emitter on the Central Server and Transmitting it to the Wireguard IP Address of the Gateway At step 530, the central server 101 can be configured to receive the ARP probe from the given emitter 115 and transmit the ARP probe to the WireGuard IP address of the given gateway 125, while confirming that the given emitter 115 corresponds to the given gateway 125 in the neighbor table 102.

The connection establishment stage 502 hence advances to step 540.

Step 540: Receiving the ARP Probe Containing the Request_Enable Value in the Operation Field from the Emitter on the Gateway At step 540, the given gateway 125 can be configured to receive, from the central server 101, the ARP probe containing the REQUEST_ENABLE value in the OPERATION field.

In response to receiving the ARP probe, at sub-step 542, the given gateway 125 can be configured to verify whether an emitter having the IP address specified in the ARP probe is added to the WireGuard interface of the given gateway 125.

If the given gateway 125 determines that the emitter having the corresponding IP address is added to the WireGuard interface of the given gateway 125, then the connection establishment stage 502 of the second method 500 proceeds to step 550.

However, if the emitter having the corresponding IP address, or, in other words, if the given emitter 115, is not added to the WireGuard interface of the given gateway 125, then at sub-step 544, the given gateway 125 can be configured to transmit, to the internal API of the central server 101, a request for receiving the emitter data of the given emitter 115, including the WireGuard IP address, the public key and the UDP address of the given emitter 115. In some non-limiting embodiments of the present technology, the request for the emitter data comprises the GRE IP address of the given emitter 115 that has been previously received in the ARP probe.

Further, the connection establishment stage 502 proceeds to sub-step 546, where the given gateway 125 can be configured to add the given emitter 115 as a peer to the WireGuard interface of the given gateway 125.

The connection establishment stage 502 then proceeds to step 550.

Step 550: Transmitting the Standard ARP Response Directly to the Emitter

At step 550, the given gateway 125 can be configured to transmit a standard ARP response to the received ARP probe to the given emitter 115 directly.

The connection establishment stage 502 then proceeds to step 560.

Step 560: In Response to Receiving, from the Central Server, a Response to the ARP Probe, Updating the Gateway Data in a Neighbor Table Hosted on the Given Emitter At step 560, the given emitter 115 can be configured to receive, from the given gateway 125, the ARP response, and update the corresponding entry in the neighbor table 102. Thus, the p2p connection between the given emitter and gateway 115, 125 has been established.

The connection establishment stage 502 of the second method 500 hence terminates.

According to certain non-limiting embodiments of the present technology, a threshold number of repeated sending attempts and a predetermined time interval for receiving the ARP response can be defined for each ARP request. For example, if the given emitter 115 fails to receive the ARP response within the predetermined interval, and the threshold number of attempts has been reached, then the given emitter 115 can be configured to switch to a backup route through the central server 101. Prior to switching to the backup route, a notification about an unsuccessful attempt of the p2p connection establishment is sent to the given gateway 125. After the given gateway 125 receives the notification about the unsuccessful attempt of the p2p connection establishment, the given gateway 125 can also be configured to switch to the backup route through the central server 101.

Further, with reference to FIGS. 6A and 6B, there is depicted a flowchart diagram of the data transmission stage 600 of the second method 500, in accordance with certain non-limiting embodiments of the present technology. More specifically, the data transmission stage 600 can include transmitting a request from the given emitter 115 to the external server 130, a flowchart of which is depicted in FIG. 6A; and receiving a response to the transmitted request from the external server 130 on the given emitter 115, as depicted in FIG. 6B. Different steps of the data transmission stage 600 can be executed by a respective on of the given emitter 115 and the given gateway 125.

Step 610: Transmitting the Outgoing Traffic Packet from the Emitter to the Gateway The data transmission stage 600 of the second method 500 commences at step 610 with the given emitter 115 being configured to transmit an outgoing traffic packet to the given gateway 125 over the established p2p connection as described above. The outgoing traffic packet comprises a payload designed for the external server 130. Prior to transmitting the outgoing traffic packet, in some non-limiting embodiments of the present technology, the given emitter 115 can be configured to encapsulate it given emitter 115 such that the packet has the following structure:

the payload level;

the GRE level, where: as the source IP address, the IP address at the GRE level of the given emitter 115 is specified; as the destination IP address, the IP address at the GRE level of the given gateway 125 is specified;

the WireGuard level, where: as the source IP address, the IP address of the given emitter 115 is specified at the WireGuard level; as the destination IP address, the IP address of the given gateway 125 is specified at the WireGuard level; and the Internet connection level, where: as the source IP address, the public IP address of given emitter 115 is specified; as the destination IP address, the IP address of the external server 130 is specified.

In some non-limiting embodiments of the present technology, the given emitter 115 may be arranged beyond the NAT 116 and may not have its own public IP address. In this case, the local IP address of the given emitter 115 is indicated as the source IP address in the outgoing traffic packet at the Internet connection level. At the same time, during transmitting the outgoing traffic packet, the natting is performed and the local IP address of the given emitter 115 that is indicated as the source IP address at the Internet connection level, which has been replaced with the public IP address of the given emitter 115.

In other non-limiting embodiments of the present technology, the given emitter 115 may have a public IP address. In this case, this public IP address is indicated as the source IP address at the Internet connection level and no natting is performed.

The data transmission stage 600 of the second method 500 hence advances to step 615.

Step 615: Receiving the Data Packet on the Gateway and Performing its Decapsulation At the step 615, the given gateway 125 can be configured to receive the outgoing traffic packet from the given emitter 115. In response to receiving the outgoing traffic packet, the given gateway 125 can be configured to decapsulate the outgoing traffic packet and the IP address of the recipient is identified at the Internet connection level by the destination IP address. The data transmission stage 600 of the second method 500 hence advances to step 620.

Step 620: Performing Encapsulation of the Packet and Transmitting the Packet from the Gateway to the External Server At the step 620, in response to detection of the destination IP address of the external server 130 as the recipient of the outgoing traffic packet at the Internet connection level at the step 615, the given gateway 125 can be configured to transmit the outgoing traffic packet to the external server 130. In some non-limiting embodiments of the present technology, the given gateway 125 can be configured to encapsulate the outgoing traffic packet such that the packet has the following structure:

the payload level;

the Internet connection level: as the source IP address, the IP address of the given gateway 125 is specified; and as the destination IP address, the IP address of the external server 130 is specified.

The data transmission stage 600 of the second method 500 hence advances to step 625.

Step 625: Receiving the Incoming Traffic Packet from the External Server on the Gateway At the step 625, the given gateway 125 can be configured to receive an incoming traffic packet from the external server 130. According to certain non-limiting embodiments of the present technology, the incoming traffic packet has the following structure:

the payload level;

the Internet connection level: as the source IP address, the IP address of the external server 130 is specified; an as the destination IP address, the IP address of the given gateway 125 is specified.

The data transmission stage 600 of the second method 500 hence advances to step 630.

Step 630: Making the Request to the Routing Table and Determining the IP Address of the Gate at the GRE Level, Determining the IP Address of the Emitter at the Wireguard Level At the step 630, according to certain non-limiting embodiments of the present technology, the given gateway 125 can be configured to transmit a request to a routing table to receive IP addresses of the gate at the GRE level, i.e., the IP address of the given emitter 115 at the GRE level are received. Further, the given gateway 125 can be configured to request the neighbor table 102 to retrieve the IP address of the given emitter 115 at the WireGuard level.

The data transmission stage 600 of the second method 500 hence advances to step 635.

Step 635: Transmitting the Data Packet from the Gateway to the Emitter

At the step 635, the given gateway 125 can be configured to transmit the received incoming traffic packet to the given emitter 115. Prior to doing so, the given gateway 125 can be configured to encapsulate the incoming traffic packet such that it has the following structure:

the payload level;

the GRE level: as the source IP address, the IP address of the given gateway 125 is specified; and as the destination IP address, the IP address of the given emitter 115 at the GRE level is specified;

the WireGuard level: as the source IP address, the IP address of the given gateway 125 at the WireGuard level is specified; and as the destination IP address, the IP address of the given emitter 115 at the WireGuard level is specified;

the Internet connection level: as the source IP address, the IP address of the external server 130 is specified; and as the destination IP address, the public IP address of the given emitter 115 is specified.

The data transmission stage 600 of the second method 500 hence advances to step 640.

Step 640: Receiving the Incoming Traffic Packet on the Emitter

At the step 640, the given emitter 115 can be configured to receive the incoming traffic packet for analyzing content thereof for maliciousness. Particularly, in one of possible embodiments, the analysis may comprise detonation (activation) of the malicious file contained in the payload of the packets, detection and studying of actions performed by the run file, etc.

In the provided exemplary embodiment, the potentially malicious file is received on the given emitter 115 and run in the isolated environment. The downloaded file may be analyzed in the isolated environment, thereby allowing to determine whether it is malicious or safe. Afterwards, if the analysis has shown that the file is safe, then the email that contained the link for downloading this file may be marked as safe and delivered to its addressee being an employee of the company "X".

Thus, the data transmission stage 600 of the second method 500 terminates.

Further, the second method 500 proceeds to the connection switching stage 700.

With reference to FIG. 7, there is depicted a flowchart diagram of the connection switching stage 700 of the second method 500, in accordance with certain non-limiting embodiments of the present technology. According to certain non-limiting embodiments of the present technology, the connection switching stage 700 includes switching the connection between the given emitter and gateway 115, 125 through the central server 101.

Step 710: Sending the ARP Request from the Emitter to the Wireguard IP Address of the Gateway The connection switching stage commences at step 710 with the given emitter 115 being configured to transmit the ARP request to the given gateway 125 according to the already present WireGuard IP address of the given gateway 125.

The connection switching stage 700 hence advances to step 720.

Step 720: ARP Response Received on the Emitter?

At step 720, it is determined whether the ARP response to the transmitted ARP probe is received by the given emitter 115 or not. If the given emitter 115 receives the ARP response, the connection switching stage 700 terminates.

However, if the given emitter 115 fails to receive the ARP response, at sub-step 722, the given emitter 115 further determines whether the threshold number of repeated attempts for receiving the ARP response is reached.

If the threshold number of the repeated attempts is not reached, then the connection switching stage 700 returns to step 710.

However, if the threshold number of the repeated attempts has been reached, i.e., the respective number of additional ARP requests has not been successful, then at sub-step 724, in some non-limiting embodiments of the present technology, the given emitter 115 can be configured to: (1) remove the given gateway 125 from the WireGuard interface of the given emitter 115; and (2) transmit the analogue of the broadcast ARP probe to the central server 101, indicating therein REQUEST_DISABLE in the OPERATION field.

The connection switching stage 700 hence advances to step 730.

Step 730: Receiving the ARP Packet from the Emitter on the Central Server and Transmitting it to the Wireguard IP Address of the Gateway At step 730, the central server 101 can be configured to: (1) receive the ARP probe from the given emitter 115 on the central server; and (2) transmit the ARP probe to the WireGuard IP address of the given gateway 125, using the neighbor table 102.

The connection switching stage 700 hence advances to step 740.

Step 740: Receiving the ARP Request on the Gateway, Removing the Emitter with the Corresponding IP Address from the Wireguard Interface of the Gateway and Updating the Entry in the Neighbor Table At step 740, the given gateway 125 can be configured to receive, from the central server 101, the ARP request, wherein REQUEST_DISABLE is indicated in the OPERATION field. In response to receiving this request on the WireGuard interface of the given gateway 125, the given gateway 125 can be configured to remove the given emitter 115 having the corresponding IP address and update the respective entry in the neighbor table 102.

The connection switching stage 700 hence advances to step 750.

Step 750: Sending the Standard ARP Response from the Gateway to the Emitter Via the Route Through the Central Server At step 750, according to certain non-limiting embodiments of the present technology, the given gateway 125 can be configured to transmit the standard ARP response to the given emitter 115 via the central server 101.

The connection switching stage 700 hence advances to step 760.

Step 760: Receiving the ARP Response from the Gateway on the Emitter and Updating the Entry in the Neighbor Table At the step 760, the given emitter 115 can be configured to receive the ARP response from the given gateway 125 and update the corresponding entry in the neighbor table 102. Thus, the backup route via the central server 101 is established on both peers.

The connection switching stage 700 and the second method 500 hence terminate.

Figure 8:
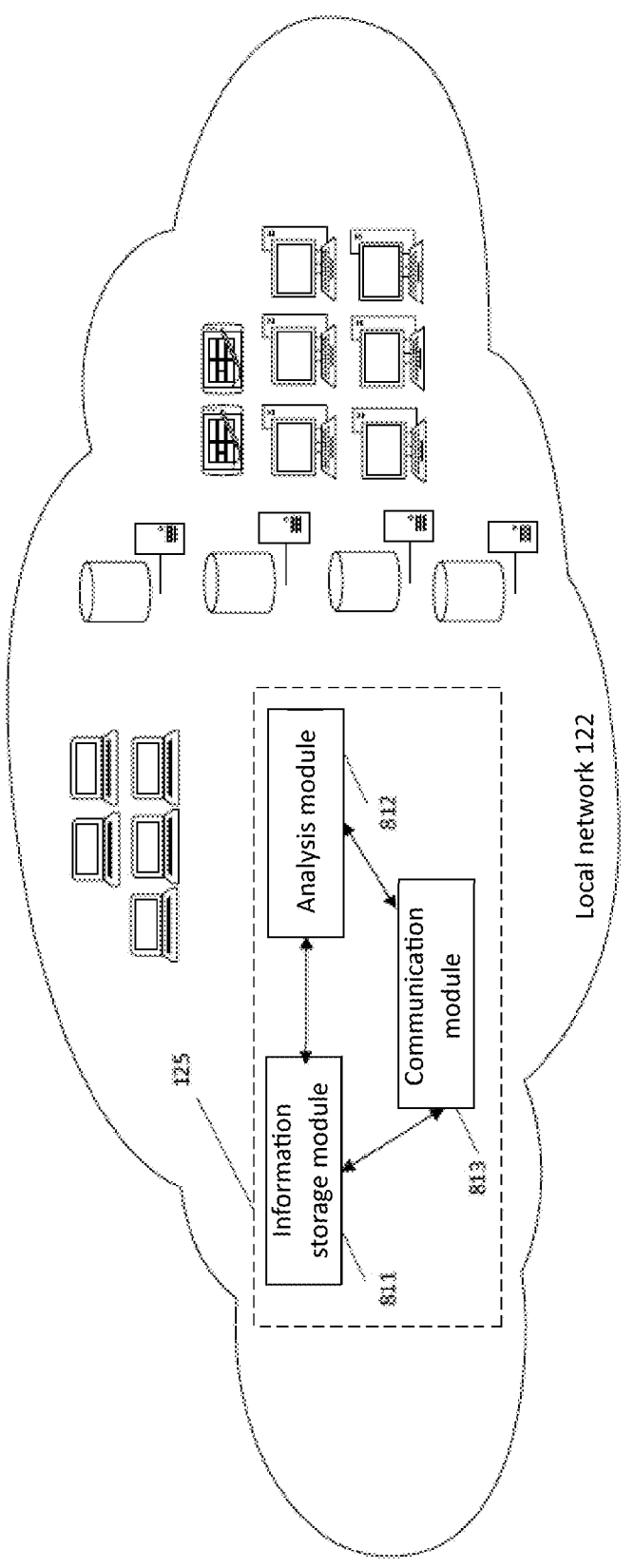
FIG. 8 depicts a schematic diagram of the given gateway in a client's local network, in accordance with certain non-limiting embodiments of the present technology.

Now, with reference to FIG. 8. there is depicted an example schematic diagram of the given gateway 125. The given gateway 125 is located in the local network 122 of the client (the company "X"). According to certain non-limiting embodiments of the present technology, the given gateway 125 comprises an information storage module 811, an analysis module 812, a communication module 813. The information storage module 811 is configured to store potentially malicious content, the configuration file, and databases. The analysis module 812 is configured to analyze the potentially malicious content and determine the sender (source) thereof. The communication module 813 is configured to receive and to send the data.

It will be clear for a person skilled in the art that the given gateway 125 may be embodied as any computing device that is located in the local network 122 of the client and that allows to act as a router; and as such, can include all or some of the components of the computing environment 900.

Computing Environment

With reference to FIG. 9, there is depicted an example functional diagram of the computing environment 900 configurable to implement certain non-limiting embodiments of the present technology including the first and second methods 300, 500 described above.

In some non-limiting embodiments of the present technology, the computing environment 900 may include: the processor 901 comprising one or more central processing units (CPUs), at least one non-transitory computer-readable memory 902 (RAM), a storage 903, input/output interfaces 904, input/output means 905, data communication means 906.

According to some non-limiting embodiments of the present technology, the processor 901 may be configured to execute specific program instructions the computations as required for the computing environment 900 to function properly or to ensure the functioning of one or more of its components. The processor 901 may further be configured to execute specific machine-readable instructions stored in the at least one non-transitory computer-readable memory 902, for example, those causing the computing environment 900 to execute the first and second methods 300, 500 described above.

In some non-limiting embodiments of the present technology, the machine-readable instructions representative of software components of disclosed systems may be implemented using any programming language or scripts, such as C, C++, C#, Java, JavaScript, VBScript, Macromedia Cold Fusion, COBOL, Microsoft Active Server Pages, Assembly, Perl, PHP, AWK, Python, Visual Basic, SQL Stored Procedures, PL/SQL, any UNIX shell scripts or XML. Various algorithms are implemented with any combination of the data structures, objects, processes, procedures, and other software elements.

The at least one non-transitory computer-readable memory 902 may be implemented as RAM and contains the necessary program logic to provide the requisite functionality.

The storage 903 may be implemented as at least one of an HDD drive, an SSD drive, a RAID array, a network storage, a flash memory, an optical drive (such as CD, DVD, MD, Blu-ray), etc. The storage 903 may be configured for long-term storage of various data, e.g., the aforementioned documents with user data sets, databases with the time intervals measured for each user, user IDs, etc.

The input/output interfaces 904 may comprise various interfaces, such as at least one of USB, RS532, RJ45, LPT, COM, HDMI, PS/2, Lightning, FireWire, etc.

The input/output means 905 may include at least one of a keyboard, joystick, (touchscreen) display, projector, touchpad, mouse, trackball, stylus, speakers, microphone, and the like. A communication link between each one of the input/output means 905 can be wired (for example, connecting the keyboard via a PS/2 or USB port on the chassis of the desktop PC) or wireless (for example, via a wireless link, e.g., radio link, to the base station, which is directly connected to the PC, e.g., to a USB port).

The data communication means 906 may be selected based on a particular implementation of the communication network 210 and may comprise at least one of: an Ethernet card, a WLAN/Wi-Fi adapter, a Bluetooth adapter, a BLE adapter, an NFC adapter, an IrDa, a RFID adapter, a GSM modem, and the like. As such, the connectivity hardware 404 may be configured for wired and wireless data transmission, via one of WAN, PAN, LAN, Intranet, Internet, WLAN, WMAN, or GSM networks.

These and other components of the computing environment 900 may be linked together using a common data bus 910.

It should be expressly understood that not all technical effects mentioned herein need to be enjoyed in each and every embodiment of the present technology.

Modifications and improvements to the above-described implementations of the present technology may become apparent to those skilled in the art. The foregoing description is intended to be exemplary rather than limiting. The scope of the present technology is therefore intended to be limited solely by the scope of the appended claims.

The invention claimed is:

1. A computer-implemented method for traffic tunneling in a distributed network for detecting malicious content, the distributed network being implemented by using two-level tunneling including a WireGuard level and a GRE level, the distributed network including a central server communicatively coupled to at least one emitter and at least one gateway, the at least one emitter being a first peer of the distributed network for analyzing the malicious content and receiving encapsulated packets at the WireGuard and GRE levels;

the at least one gateway being a second peer of the distributed network for natting at least one outgoing traffic packet and denatting at least one incoming traffic packet;

the method being executable by a given emitter of the at least one emitter, the method comprising:

transmitting, to the central server, a request for receiving a gateway data from a given gateway of the at least one gateway, the request comprising an IP address of the given gateway at the WireGuard level, a public key, a UDP address;

in response to receiving, from the central server, the gateway data, adding the given gateway as a peer to a WireGuard interface of the given emitter;

transmitting, to the central server, an Address Resolution Protocol (ARP) probe, the ARP probe being indicative of whether the given emitter is ready to establish a p2p connection with the given gateway;

in response to receiving, from the central server, a response to the ARP probe, updating the gateway data in a neighbor table hosted on the given emitter;

transmitting the at least one outgoing traffic packet to the given gateway for natting, the at least one outgoing traffic packet including at least two levels of encapsulation over a transport protocol implemented for forwarding the at least one outgoing traffic packet, via the p2p connection, to the given gateway for natting the at least one outgoing traffic packet for further transmitting the at least one outgoing traffic packet to an external server on behalf of the given gateway; and in response to receiving, from the given gateway, the at least one incoming traffic packet, analyzing a content of the at least one incoming traffic packet for maliciousness.

2. The method of claim 1, wherein the request for receiving the gateway data further comprises the IP address of the given gateway at the GRE level.

3. The method of claim 1, wherein the IP address of the given gateway includes:

an Internet IP address;

an IP address at the WireGuard level; and an IP address at the GRE level.

4. The method of claim 1, wherein, prior to the transmitting the request, the at least one emitter and the at least one gateway have been registered on the central server by a respective configuration file.

5. The method of claim 1, further comprising, prior to the transmitting the request, registering the given emitter on the central server by receiving therefrom a configuration file.

6. The method of claim 5, further comprising configuring interfaces of the given emitter at the WireGuard level and the GRE level using the configuration file.

7. The method of claim 1, wherein, in response to a time interval for receiving the APR response after the transmitting the ARP request exceeding a predetermined time threshold, the method further comprises transmitting, to the central server, an additional ARP request.

8. The method of claim 7, wherein, in response to a number of additional ARP requests exceeding a predetermined number threshold, the method further comprises switching the given emitter to a backup route through the central server.

9. The method of claim 8, wherein the switching to the backup route comprises transmitting a respective request to the given gateway.

10. A computer-implemented method for traffic tunneling in a distributed network for detecting malicious content, the distributed network being implemented by using two-level tunneling including a WireGuard level and a GRE level, the distributed network including a central server communicatively coupled to at least one emitter and at least one gateway, the method being executable by a given gateway of the at least one gateway, the method comprising:

in response to receiving, from the central server, an Address Resolution Protocol (ARP) probe of a given emitter of the at least one emitter, determining whether an emitter having an IP address indicated in the ARP probe is present on a WireGuard interface of the given gateway;

in response to an absence of the emitter having the IP address indicated in the ARP probe on the WireGuard interface of the given gateway, transmitting, to the central server, a request for receiving an emitter data comprising an IP address of the given emitter at the WireGuard level, a public key, a UDP address, for establishing a p2p connection;

in response to receiving, from the central server, the emitter data of the given emitter, adding the given emitter as a peer to a neighbor table hosted on the given gateway;

transmitting, to the given emitter, a response to the ARP probe therefrom, the response being indicative of the given gateway being ready to establish the p2p connection with the given emitter;

in response to receiving, from the given emitter, at least one outgoing traffic packet, decapsulating the at least one outgoing traffic packet;

identifying, in the at least one outgoing traffic packet, data of an external server for forwarding the at least one outgoing traffic packet, the data having been specified at a GRE level of the at least one outgoing traffic packet;

encapsulating the at least one outgoing traffic packet, the encapsulating including natting the at least one outgoing traffic packet, thereby generating at least one natted outgoing traffic packet, the natting comprising specifying, for the at least one outgoing traffic, an IP address of the given gateway as being a sender of the at least one outgoing traffic packet to the external server;

transmitting the at least one natted outgoing traffic packet to the external server;

in response to receiving, from the external server, at least one incoming traffic packet, denatting the at least one incoming traffic packet;

encapsulating the at least one incoming traffic packet at the WireGuard level and the GRE level, wherein at least one IP address indicated at the WireGuard level differs from at least one IP address indicated at the GRE level; and transmitting the at least one incoming traffic packet to the given emitter for analyzing a content of the at least one incoming traffic packet for maliciousness.

11. The method of claim 10, wherein the request for receiving the emitter data of the given emitter further comprises the IP address of the given emitter at the GRE level.

12. The method of claim 10, wherein, prior to the transmitting the request, the at least one emitter and the at least one gateway have been registered on the central server by a respective configuration file.

13. The method of claim 10, further comprising, prior to the transmitting the request, registering the given gateway on the central server by receiving therefrom a configuration file.

14. The method of claim 13, further comprising configuring interfaces at the WireGuard level and the GRE level using the configuration file.

15. The method of claim 10, wherein, in response to receiving, from the given emitter, a request for switching to a backup route through the central server, the method further comprises switching to the backup route.

16. A method for traffic tunneling in a distributed network for malware detonation, the distributed network being implemented by using two-level tunneling including a WireGuard level and a GRE level, the distributed network including a central server communicatively coupled to at least one emitter and at least one gateway, the method being executable by the central server, the method comprising:

in response to receiving, from a given emitter of the at least one emitter, an Address Resolution Protocol (ARP) probe, the ARP probe specifying a first IP address of the given emitter and a second IP address of a respective gateway:

determining whether the first IP address of the given emitter has been added to a WireGuard interface of the respective gateway and whether the second IP address of the respective gateway has been added to a WireGuard interface of the given emitter; and in response to determining that the first IP address of the given emitter has been added to a WireGuard interface of the respective gateway and that the second IP address of the respective gateway has been added to a WireGuard interface of the given emitter, transmitting the ARP probe to the respective gateway.

17. The method of claim 16, comprising registering the at least one emitter and the at least one gateway on the at least one central server by generating a respective configuration file.

18. An electronic device for traffic tunneling in a distributed network for detecting malicious content, the distributed network being implemented by using two-level tunneling including a WireGuard level and a GRE level, the electronic device being communicatively coupled, via the distributed network, to a central server and at least one gateway, the electronic device being a first peer of the distributed network for analyzing the malicious content and receiving encapsulated packets at the WireGuard and GRE levels;

the at least one gateway being a second peer of the distributed network for natting at least one outgoing traffic packet and denatting at least one incoming traffic packet;

the electronic device comprising at least one processor and at least one non-transitory computer-readable memory storing executable instructions, which, when executed by the at least one processor, cause the electronic device to:

transmit, to the central server, a request for receiving a gateway data from a given gateway of the at least one gateway, the request comprising an IP address of the given gateway at the WireGuard level, a public key, a UDP address;

in response to receiving, from the central server, the gateway data, add the given gateway as a peer to a WireGuard interface of the electronic device;

transmit, to the central server, an Address Resolution Protocol (ARP) probe, the ARP probe being indicative of whether the electronic device is ready to establish a p2p connection with the given gateway;

in response to receiving, from the central server, a response to the ARP probe, update the gateway data in a neighbor table hosted on the electronic device;

transmit the at least one outgoing traffic packet to the given gateway for natting, the at least one outgoing traffic packet including at least two levels of encapsulation over a transport protocol implemented for forwarding the at least one outgoing traffic packet, via the p2p connection, to the given gateway for natting the at least one outgoing traffic packet for further transmitting the at least one outgoing traffic packet to an external server on behalf of the given gateway; and in response to receiving, from the given gateway, the at least one incoming traffic packet, analyze a content of the at least one incoming traffic packet for maliciousness.

19. The electronic device of claim 18, wherein the request for receiving the gateway data further comprises the IP address of the given gateway at the GRE level.

20. The electronic device of claim 18, wherein the IP address of the given gateway includes:

an Internet IP address;

an IP address at the WireGuard level; and an IP address at the GRE level.

21. The electronic device of claim 18, wherein, prior to transmitting the request, the electronic device and the at least one gateway have been registered on the central server by a respective configuration file.

22. The electronic device of claim 18, wherein, prior to causing transmitting the request, the at least one processor causes the electronic device to register the electronic device on the central server by receiving therefrom a configuration file.

23. The electronic device of claim 22, wherein the at least one processor further causes the electronic device to configure interfaces thereof at the WireGuard level and the GRE level using the configuration file.

24. The electronic device of claim 18, wherein, in response to a time interval for receiving the APR response after causing transmitting the ARP request exceeding a predetermined time threshold, the at least one processor further causes the electronic device to transmit, to the central server, an additional ARP request.

25. The electronic device of claim 24, wherein, in response to a number of additional ARP requests exceeding a predetermined number threshold, the at least one processor further causes the electronic device to switch the electronic device to a backup route through the central server.

26. The electronic device of claim 25, wherein to switch to the backup route, the at least one processor further causes the electronic device to transmit a respective request to the given gateway.

27. An electronic device for traffic tunneling in a distributed network for detecting malicious content, the distributed network being implemented by using two-level tunneling including a WireGuard level and a GRE level, the electronic device being communicatively coupled, via the distributed network, to a central server and at least one emitter, the electronic device comprising at least one processor and at least one non-transitory computer-readable memory storing executable instructions, which, when executed by the at least one processor, cause the electronic device to:

in response to receiving, from the central server, an Address Resolution Protocol (ARP) probe of a given emitter of the at least one emitter, determine whether an emitter having an IP address indicated in the ARP probe is present on a WireGuard interface of the electronic device;

in response to an absence of the emitter having the IP address indicated in the ARP probe on the WireGuard interface of the electronic device, transmit, to the central server, a request for receiving an emitter data comprising an IP address of the given emitter at the WireGuard level, a public key, a UDP address, for establishing a p2p connection;

in response to receiving, from the central server, the emitter data of the given emitter, add the given emitter as a peer to a neighbor table hosted on the electronic device;

transmit, to the given emitter, a response to the ARP probe therefrom, the response being indicative of the electronic device being ready to establish the p2p connection with the given emitter;

in response to receiving, from the given emitter, at least one outgoing traffic packet, decapsulate the at least one outgoing traffic packet;

identify, in the at least one outgoing traffic packet, data of an external server for forwarding the at least one outgoing traffic packet, the data having been specified at a GRE level of the at least one outgoing traffic packet;

encapsulate the at least one outgoing traffic packet by natting the at least one outgoing traffic packet, thereby generating at least one natted outgoing traffic packet, the natting comprising specifying, for the at least one outgoing traffic, an IP address of the electronic device as being a sender of the at least one outgoing traffic packet to the external server;

transmit the at least one natted outgoing traffic packet to the external server;

in response to receiving, from the external server, at least one incoming traffic packet, denat the at least one incoming traffic packet;

encapsulate the at least one incoming traffic packet at the WireGuard level and the GRE level, wherein at least one IP address indicated at the WireGuard level differs from at least one IP address indicated at the GRE level; and transmit the at least one incoming traffic packet to the given emitter for analyzing a content of the at least one incoming traffic packet for maliciousness.

28. The electronic device of claim 27, wherein the request for receiving the emitter data of the given emitter further comprises the IP address of the given emitter at the GRE level.

29. The electronic device of claim 27, wherein, prior to causing transmitting the request, the at least one emitter and the electronic device have been registered on the central server by a respective configuration file.

30. The electronic device of claim 27, wherein, prior to causing transmitting the request, the at least one processor further causes the electronic device to register the electronic device on the central server by receiving therefrom a configuration file.

31. The electronic device of claim 30, wherein the at least one processor further causes the electronic device to configure interfaces at the WireGuard level and the GRE level using the configuration file.

32. The electronic device of claim 27, wherein, in response to receiving, from the given emitter, a request for switching to a backup route through the central server, the at least one processor further causes the electronic device to switch to the backup route.

33. A server for traffic tunneling in a distributed network for malware detonation, the distributed network being implemented by using two-level tunneling including a WireGuard level and a GRE level, the server being communicatively coupled, via the distributed network, to at least one emitter and at least one gateway, the server comprising at least one processor and at least one non-transitory computer-readable memory storing executable instructions, which, when executed by the at least one processor, cause the server to:

in response to receiving, from a given emitter of the at least one emitter, an Address Resolution Protocol (ARP) probe, the ARP probe specifying a first IP address of the given emitter and a second IP address of a respective gateway:

determine whether the first IP address of the given emitter has been added to a WireGuard interface of the respective gateway and whether the second IP address of the respective gateway has been added to a WireGuard interface of the given emitter; and in response to determining that the first IP address of the given emitter has been added to a WireGuard interface of the respective gateway and that the second IP address of the respective gateway has been added to a WireGuard interface of the given emitter, transmit the ARP probe to the respective gateway.

34. The server of claim 33, wherein the at least one processor further causes the server to register the at least one emitter and the at least one gateway on the at least one central server by generating a respective configuration file.

\* \* \* \* \*